United States Patent [19]
Yamamoto et al.

[11] Patent Number: 5,508,913
[45] Date of Patent: Apr. 16, 1996

[54] ELECTRONIC AUTOMATIC OFFER MATCHING SYSTEM FOR FREEZER EXCHANGE TRANSACTIONS AMONG BANKS

[75] Inventors: Kenichi Yamamoto, Kawasaki; Yoshihisa Kimura, Oomiya; Yasuhide Yamamoto, Tokyo, all of Japan

[73] Assignee: Fujitsu Limited, Kawasaki, Japan

[21] Appl. No.: 214,745

[22] Filed: Mar. 18, 1994

[30] Foreign Application Priority Data

Apr. 23, 1993 [JP] Japan .................................. 5-097922

[51] Int. Cl.⁶ .................................................. G06F 19/00
[52] U.S. Cl. .................................................. 364/408
[58] Field of Search .................................. 364/408, 401, 364/400

[56] References Cited

U.S. PATENT DOCUMENTS

| | | | |
|---|---|---|---|
| 3,573,747 | 4/1971 | Adams et al. .................. | 340/172.5 |
| 4,554,418 | 11/1985 | Toy ................................ | 179/2 DP |
| 4,674,044 | 6/1987 | Kalmus et al. ................. | 364/408 |
| 4,903,201 | 2/1990 | Wagner .......................... | 364/408 |
| 4,980,826 | 12/1990 | Wagner .......................... | 364/408 |
| 5,038,284 | 8/1991 | Kramer .......................... | 364/408 |
| 5,077,665 | 12/1991 | Silverman et al. ............. | 364/408 |
| 5,101,353 | 3/1992 | Lupien et al. .................. | 364/408 |
| 5,136,501 | 8/1992 | Silverman et al. ............. | 364/408 |
| 5,220,501 | 6/1993 | Lawlor et al. .................. | 364/408 |
| 5,297,031 | 3/1994 | Gutterman et al. ............ | 364/408 |

FOREIGN PATENT DOCUMENTS

| | | |
|---|---|---|
| 61-502367 | 10/1986 | Japan . |
| 63-271558 | 11/1988 | Japan . |
| 3-085047 | 4/1991 | Japan . |
| 4-032938 | 2/1992 | Japan . |

*Primary Examiner*—Donald E. McElheny, Jr.
*Attorney, Agent, or Firm*—Staas & Halsey

[57] ABSTRACT

An electronic dealing system which performs foreign exchange transactions among banks etc. by matching terms of sale and terms of purchase, provided with a leave-order function whereby a dealing terminal may continue to place orders on the market and automatically perform transactions even after log-out processing. This enables transactions to be safely performed even when the operator is not present.

10 Claims, 26 Drawing Sheets

Fig.5

| LOG-IN/DEAL-IN SEQUENCE | STATE OF VIP | NOTE |
|---|---|---|
| USUAL PATTERN<br>501: LOG-IN<br>502: DEAL-IN<br>503: DEAL-OUT<br>504: LOG-OUT | ↔ | • DEAL-IN REQUEST IS POSSIBLE DURING LOG-IN ONLY<br>• DEAL-OUT REQUEST IS POSSIBLE DURING DEAL-IN ONLY |
| LEAVE-ORDER PATTERN<br>51: LOG-IN<br>52: DEAL-IN<br>53: DEAL-OUT<br>54: LOG-OUT<br>55: LOG-IN<br>56: DEAL-IN<br>57: DEAL-OUT<br>58: LOG-OUT | ↔ | • DEALING SERVICE IS PROVIDED EVEN IN LOG-OUT WHEN LEAVE-ORDER IS SPECIFIED AND IF ORDER EXISTS |

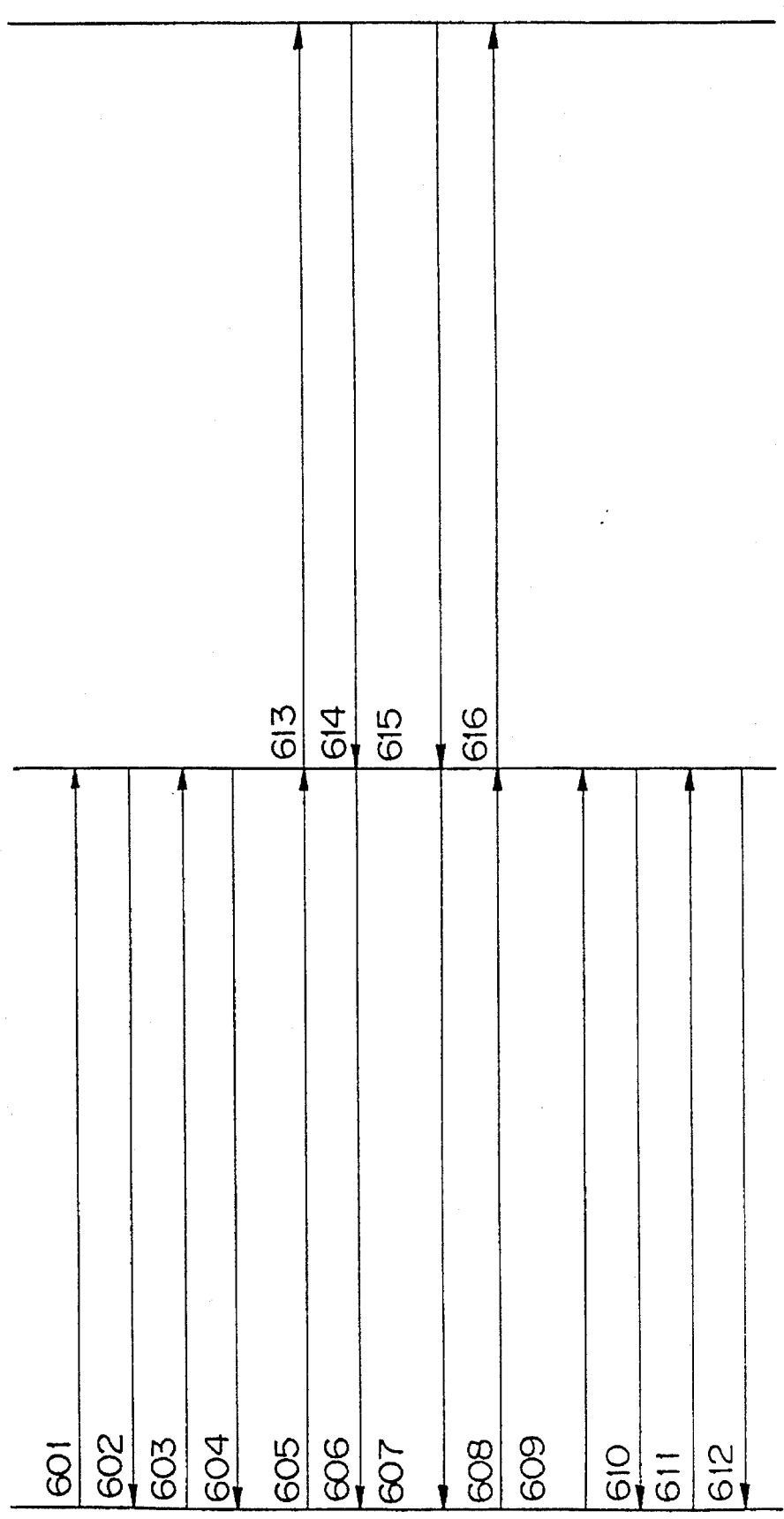

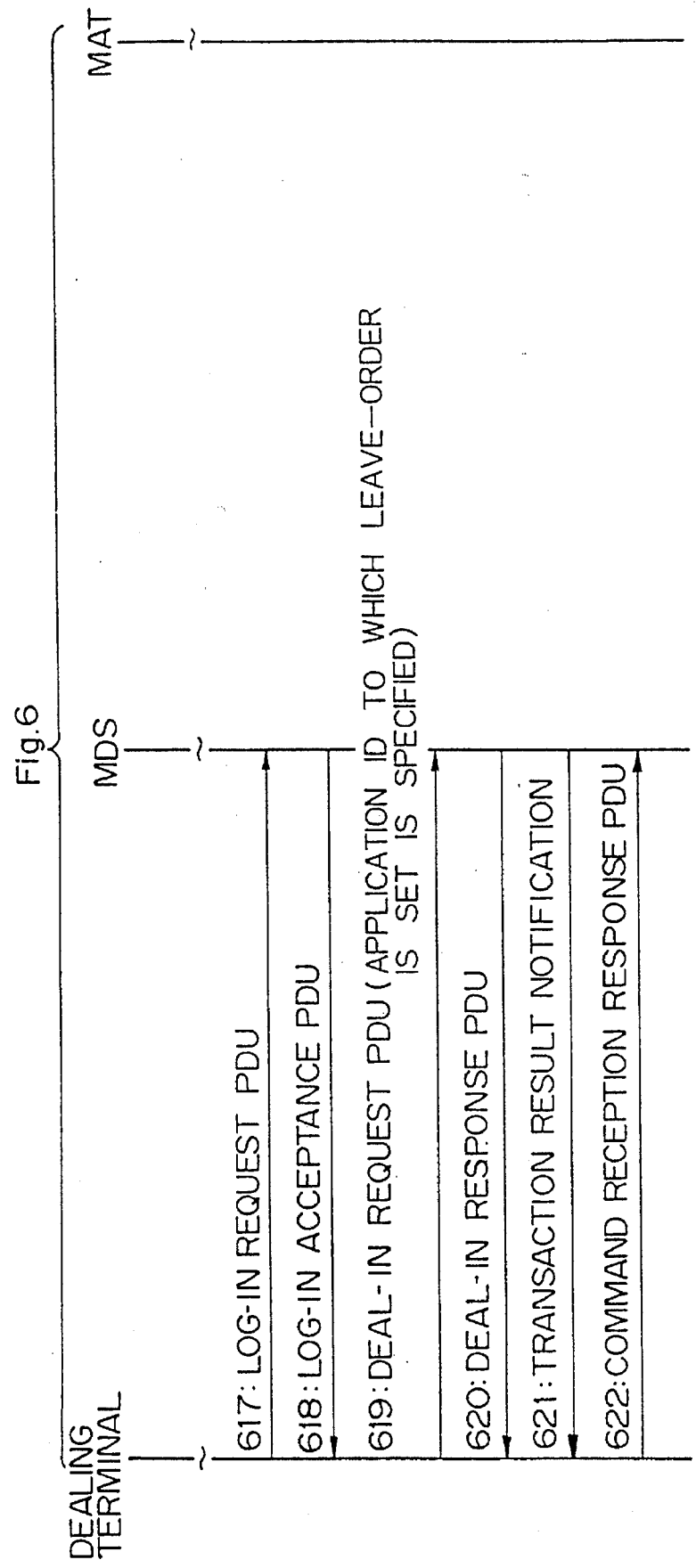

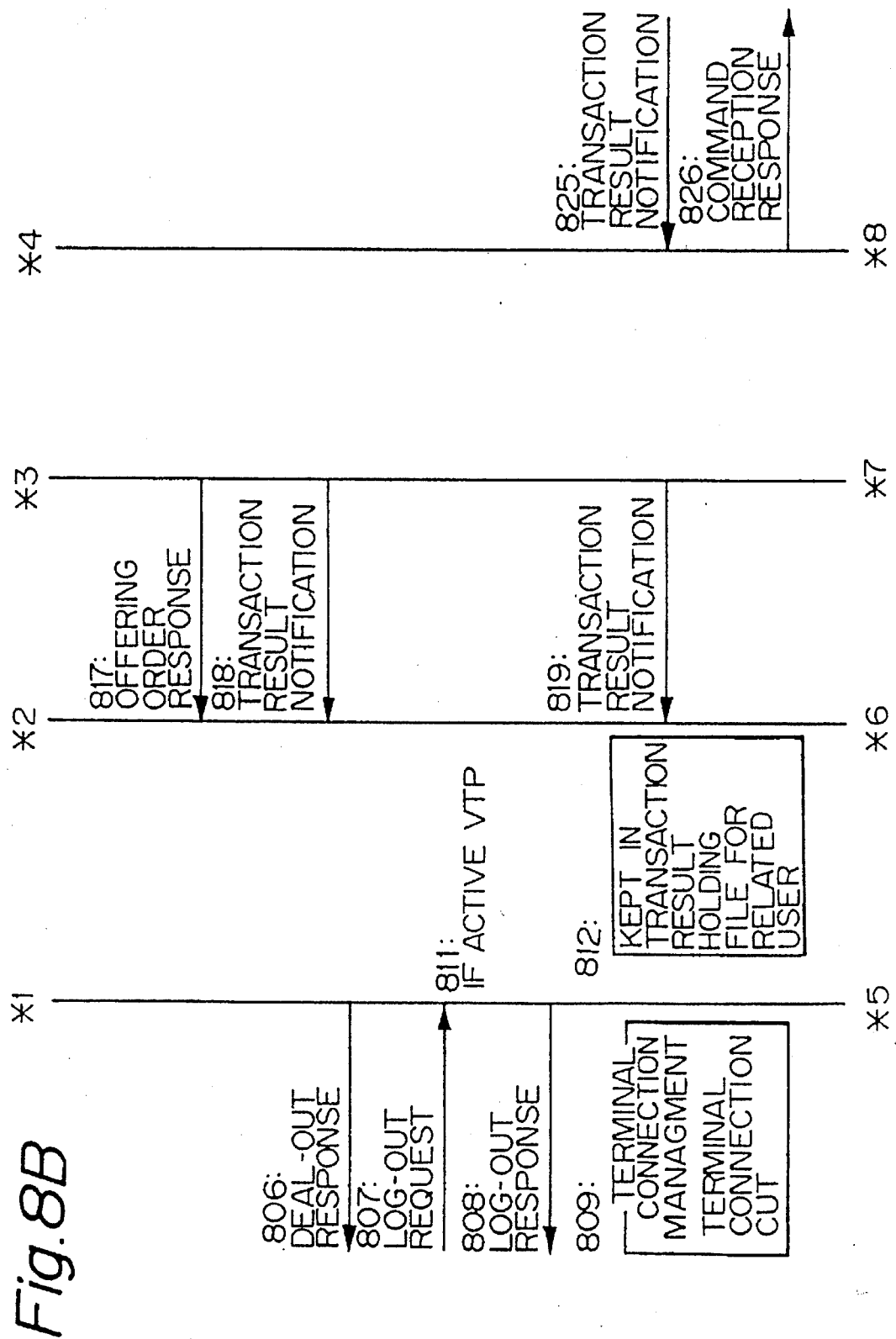

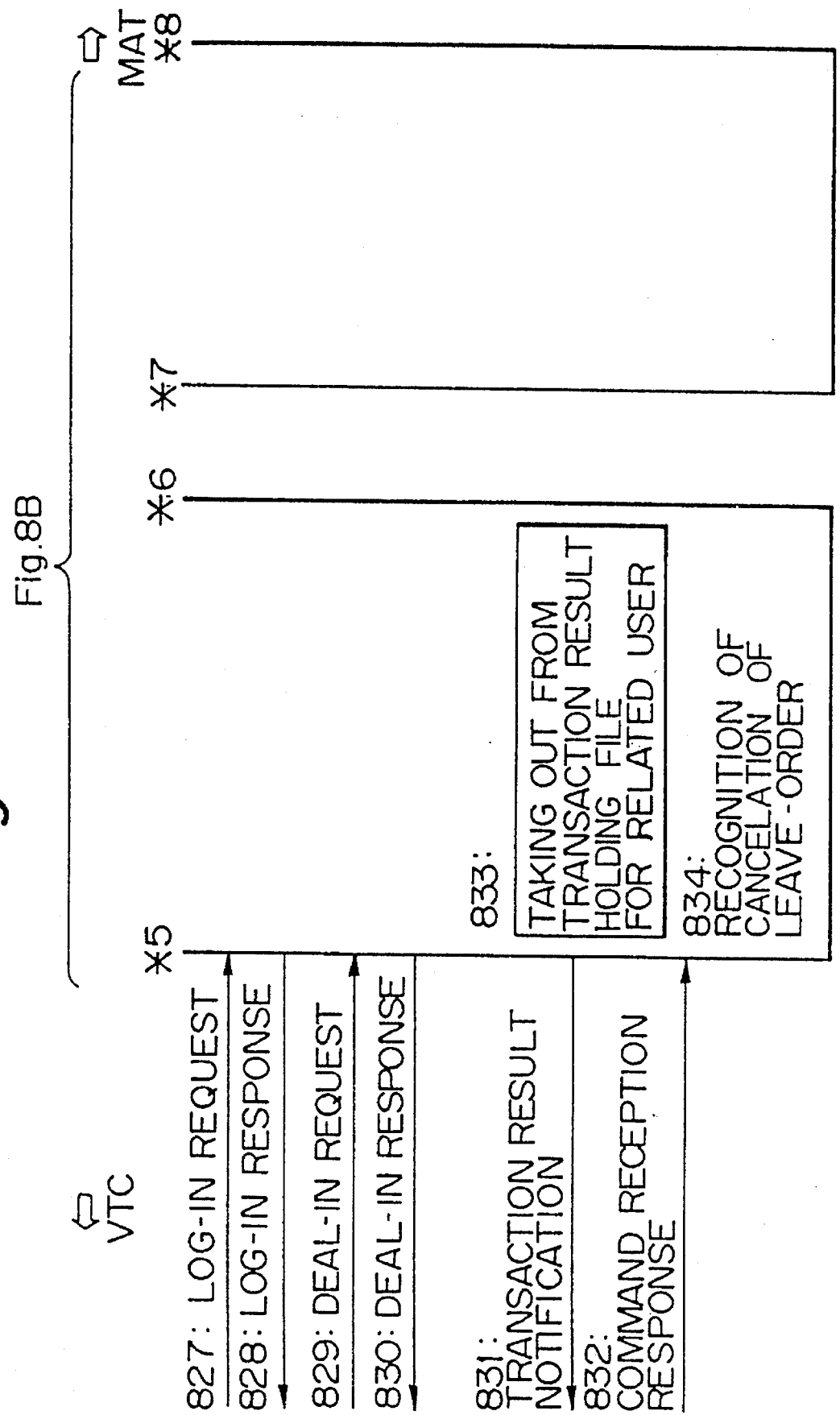

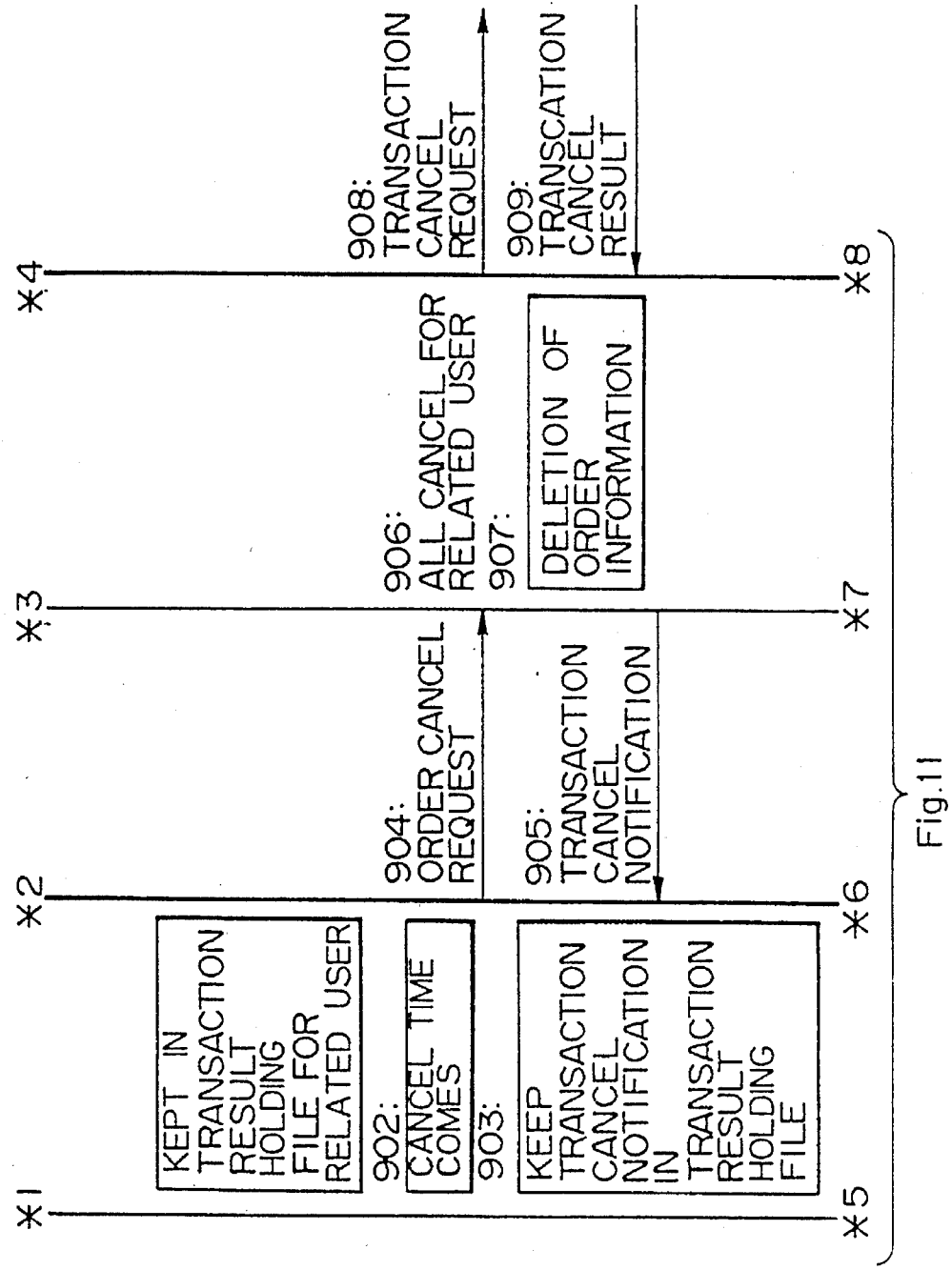

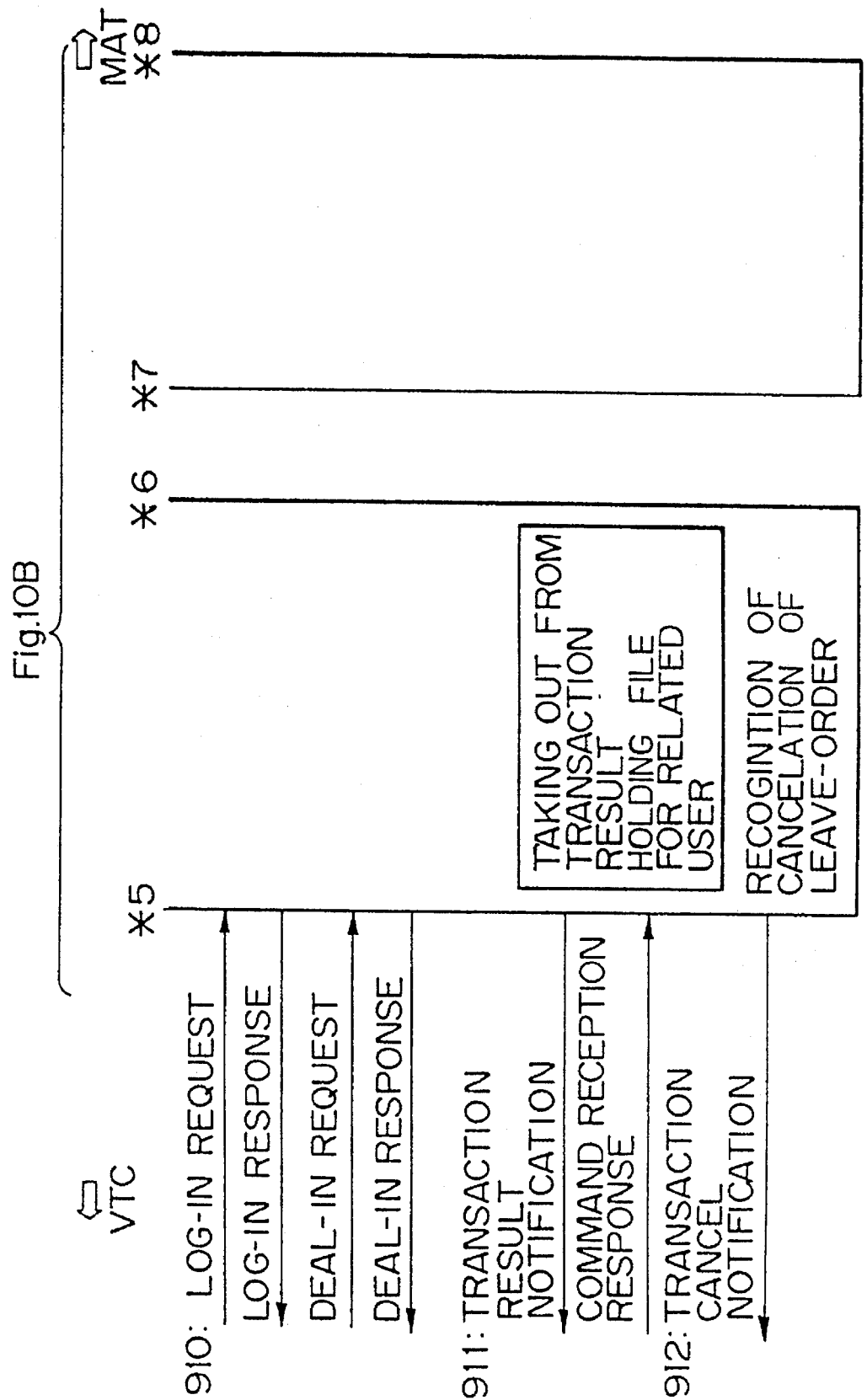

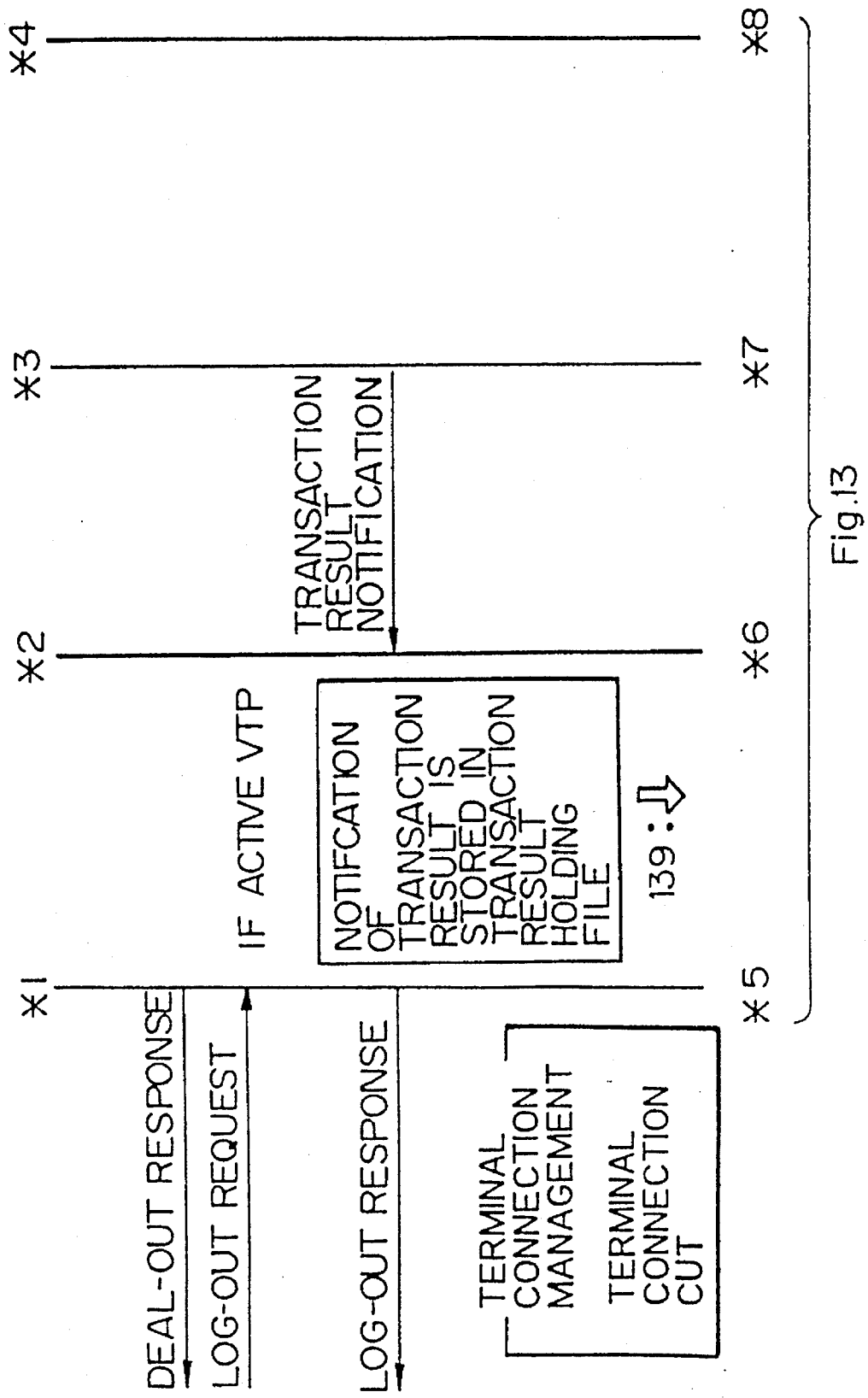

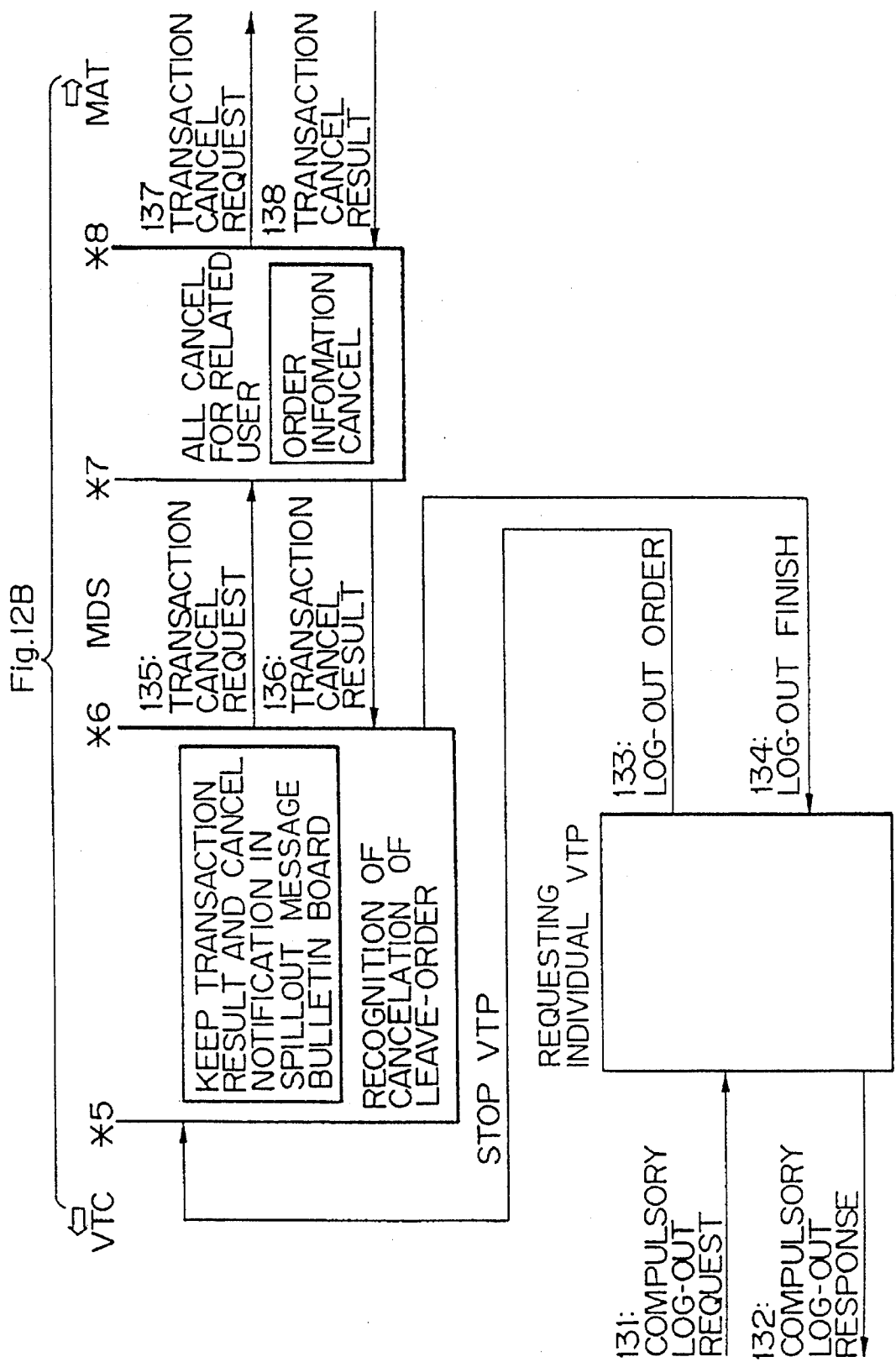

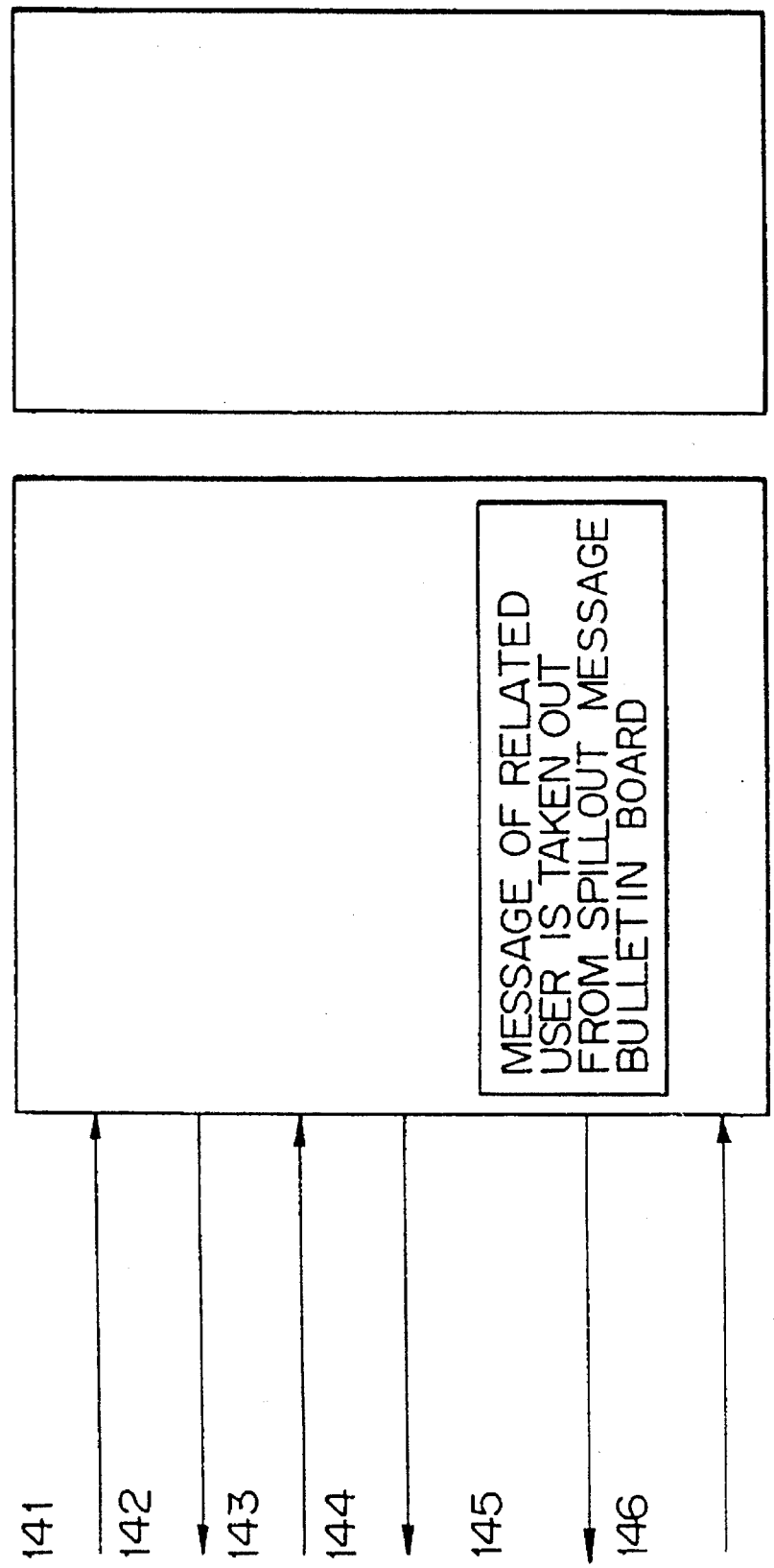

Fig.19A

```
| MANAGEMENT |

☐ DEALING SERVICE

☐ CONFIRMATION SERVICE

☐ ALL MARKET
    INFORMATION

MENU | 1993/04/12 10:00 M |
```

Fig.19B

```
| DEALING SERVICE    /VAL 1993/04/14 |
| MARKET AMT PTY | YOUR OFFERS |
|                |             |

/ *

| BUY/SELL  |
                          | TOTAL AMT |
                          | TOTAL TRS |
                          | AVE.PRICE |

MENU | 1993/04/12 10:02 M |
```

Fig.20

| — | DEALING SERVICE | /VAL 1993/04/14 |
|---|---|---|

| MARKET AMT PTY | YOUR OFFERS |
|---|---|
| | 123.45  10  1  0  10:03 |
| | 123.50  10  1  0  10:04 |
| | 123.60  10  1  0  10:05 |
| 123.60 *  10  1 | YOUR BIDS |
| 123.50 *  10  1 | |
| 123.45 *  10  1 | |

/ *

10:05 OFFER 123.60 10 MIO MINI 1 HIDN 0 ***

BUY/SELL

| TOTAL AMT |
|---|
| TOTAL TRS |
| AVE. PRICE |

MENU  1993/04/12 10:06 M

| DEALING SERVICE | /VAL 1993/04/14 |

| MARKET | AMT | PTY | YOUR OFFERS |
| | | | 123.45 10 1 O 10:03 |
| | | | 123.50 10 1 O 10:04 |
| | | | 123.60 10 1 O 10:05 |

123.60
123.50
123.45

LEAVE-OUT

☐ CANCEL TIME    [10] hour [00] minutes

[EXEC]  QUIT

10:05 OFFER 123.60 10 MIO MINI 1 HIDN O×××

BUY/SELL

TOTAL AMT
TOTAL TRS
AVE. PRICE

MENU 1993/04/12 10:06 M

Fig.23

| DEALING SERVICE | | | /VAL 1993/04/14 |
|---|---|---|---|
| MARKET AMT PTY | YOUR OFFERS | | 231 |
| | 123.60 10 1 O 10:05 | | |
| | YOUR BIDS | | |
| 123.60* 10 1 * | | | |

| / * |
|---|

| DONE 10 MIO (1TRS)*** | | BUY/SELL |
|---|---|---|
| 11:50 SEL 10 MIO 123.50XXXXX | | TOTAL AMT |
| DONE 10 MIO (1TRS)*** | | |
| 11:30 SEL 10 MIO 123.45XXXXX | | TOTAL TRS |
| 230 | | AVE. PRICE |

| MENU | 1993/04/12 13:15 M | | | | |

ELECTRONIC AUTOMATIC OFFER MATCHING SYSTEM FOR FREEZER EXCHANGE TRANSACTIONS AMONG BANKS

BACKGROUND OF THE INVENTION

1. Field of the Invention

The present invention relates to an electronic dealing system, more particularly an electronic dealing system for foreign exchange transactions among banks.

2. Description of the Related Art

At the present time, foreign exchange transactions among banks are performed through the agency of brokers or by direct transactions between the banks. These transactions are all performed over the telephone (telephone market). Therefore, an electronic dealing system which acts as a computerized electronic agency is desired. In such an electronic dealing system, it is further desired that transactions can be continued even after the operator of a dealing terminal leaves the terminal.

SUMMARY OF THE INVENTION

Therefore, the present invention, in consideration of the related art, has as its object the provision of an electronic dealing system which enables transactions to be safely continued even when the operator has left the terminal, for example, when the operator goes home.

To attain the above object, the present invention provides an electronic dealing system which performs transactions by matching the terms of sale and terms of purchase and which is provided with what we may call a "leave-order" function whereby a dealing terminal may continue to place orders on the market and automatically perform transactions even after log-out processing.

According to the electronic dealing system of the present invention, the provision of the leave-order function enables a dealing terminal to continue to place orders on the market and automatically perform transactions even after log-out processing and thereby enables transactions to be safely performed even when the operator is not at the dealing terminal, for example, when the operator has gone home.

BRIEF DESCRIPTION OF THE DRAWINGS

The above object and features of the present invention will be more apparent from the following description of the preferred embodiments with reference to the accompanying drawings, wherein:

FIG. 5 is a view for explaining the state of the virtual terminal processes (VTP's) in an electronic dealing system based on the present invention;

FIG. 6 is a view of an example of a sequence in the case of a leave-order state in the electronic dealing system of the present invention (part 1);

FIG. 7 is a view of an example of a sequence in the case of a leave-order state in the electronic dealing system of the present invention (part 2);

FIGS. 8A and 8B are views of an example of a control sequence in the case of establishment of a transaction in the leave-order state in the electronic dealing system of the present invention (part 1);

FIG. 9 is a view of an example of a control sequence in the case of establishment of a transaction in the leave-order state in the electronic dealing system of the present invention (part 2);

FIGS. 10A and 10B are views of an example of a control sequence in processing for canceling a leave-order state at a set time in the electronic dealing system of the present invention (part 1);

FIG. 11 is a view of an example of a control sequence in processing for canceling a leave-order state at a set time in the electronic dealing system of the present invention (part 2);

FIGS. 12A and 12B are views of an example of a control sequence in processing for compulsorily resetting a virtual terminal process VTP in the leave-order state in the electronic dealing system of the present invention (part 1);

FIG. 13 is a view of an example of a control sequence in processing for compulsorily resetting a virtual terminal process VTP in the leave-order state in the electronic dealing system of the present invention (part 2);

FIG. 14 is a view of an example of a control sequence in processing for compulsorily resetting a virtual terminal process VTP in the leave-order state in the electronic dealing system of the present invention (part 3);

FIGS. 19A and 19B are views of examples of screens displayed on a terminal in the electronic dealing system of the present invention (part 2);

FIG. 20 is a view of an example of a screen displayed on a terminal in the electronic dealing system of the present invention (part 3);

FIG. 21 is a view of an example of a screen displayed on a terminal in the electronic dealing system of the present invention (part 4);

FIG. 23 is a view of an example of a screen displayed on a terminal in the electronic dealing system of the present invention (part 6).

DESCRIPTION OF THE PREFERRED EMBODIMENTS

Below, an embodiment of the electronic dealing system of the present invention will be described with reference to the drawings.

Figure 1:
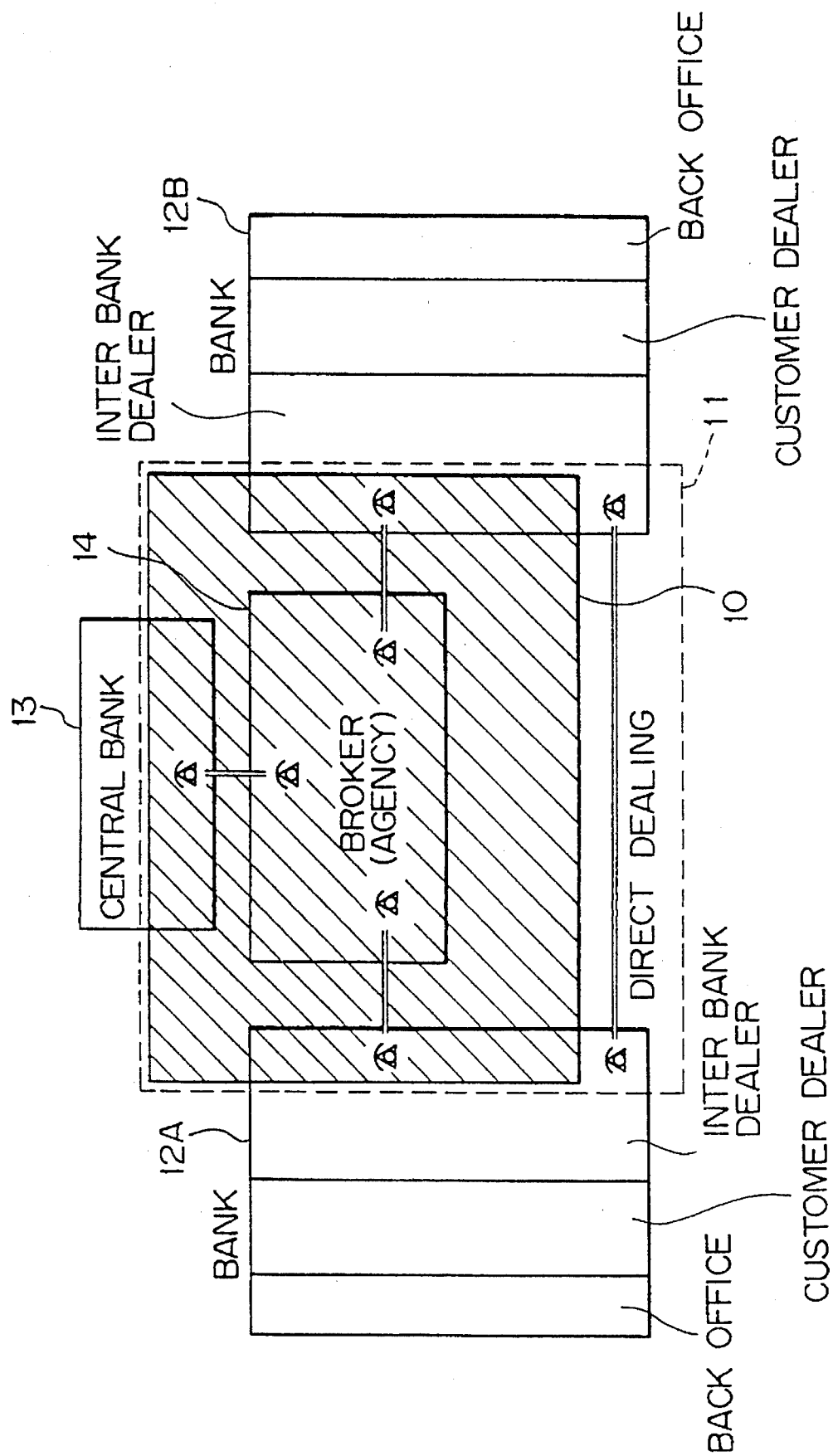
FIG. 1 is a conceptual view of an example of the constitution of a foreign exchange transaction in an electronic dealing system to which the present invention is applied.

FIG. 1 is a conceptual view of an example of the constitution of a foreign exchange transaction in an electronic dealing system to which the present invention is applied. In the figure, reference numeral 11 is an electronic dealing system, 12A and 12B are banks, 13 is a central bank, and 14 is a broker (agency).

As shown in FIG. 1, a foreign exchange transaction is either performed by a plurality of banks 12A and 12B and a central bank 14 or else is peformed directly between the banks (direct dealing). The banks 12A and 12B are, for example, comprised of interbank dealers, customer dealers, and back offices. The electronic dealing system of the present invention relates to a foreign exchange transaction (10) performed through a broker 14.

Figure 2:
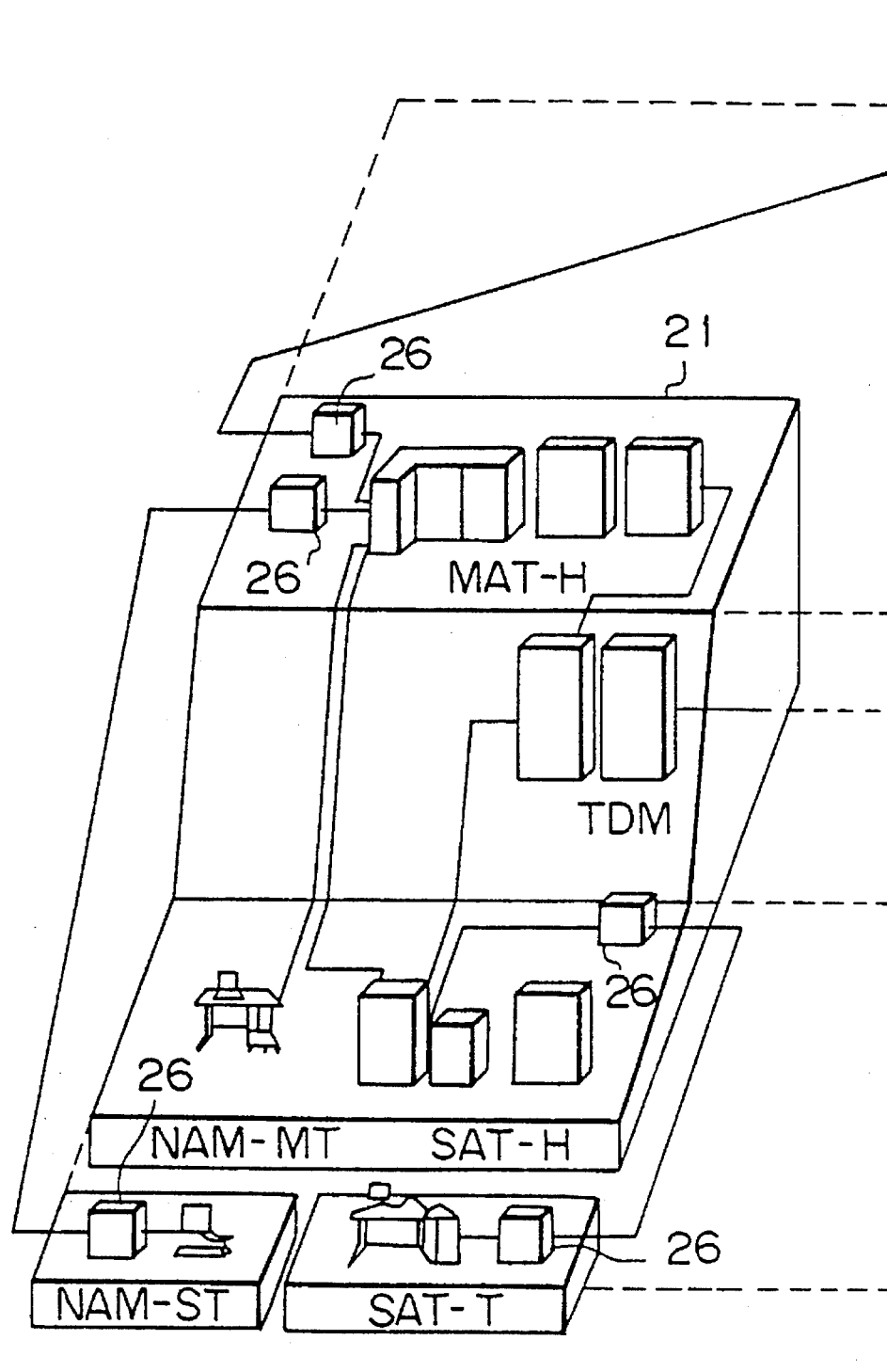
FIG. 2 is a schematic view of an example of the overall configuration of an electronic dealing system to which the present invention is applied (part 1)
Figure 3:
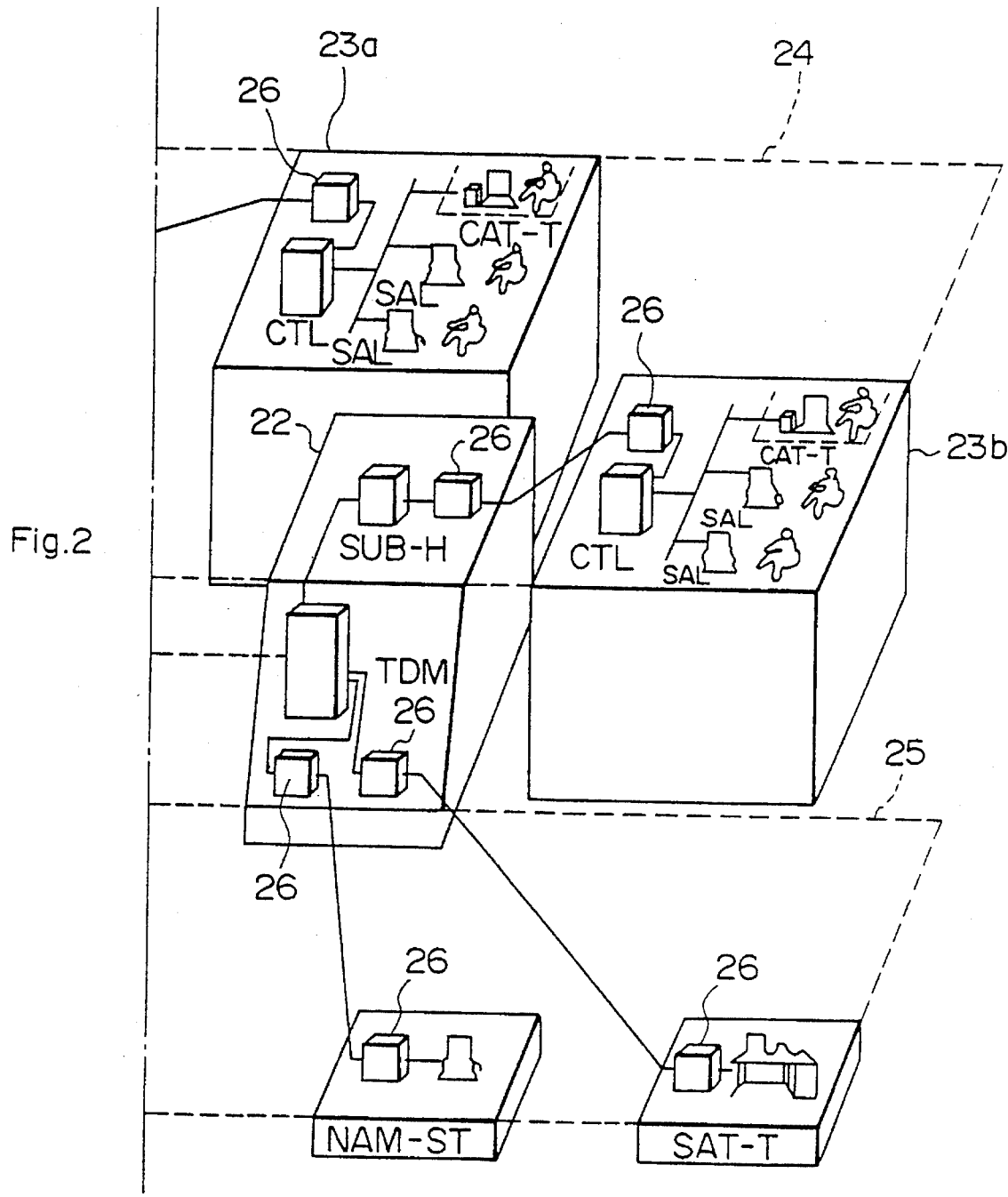
FIG. 3 is a schematic view of an example of the overall configuration of an electronic dealing system to which the present invention is applied (part 2)

FIG. 2 and FIG. 3 are schematic views of an example of the overall configuration of an electronic dealing system to which the present invention is applied. In FIG. 2 and FIG. 3, reference numeral 21 is a main center, 22 is a sub-center, 23a and 23b are customer offices, 24 is a dealing part, 25 is a maintenance and operation part, and 26 is an encipher apparatus. Further, reference MAT-H is a matching host serving as the main frame for brokering exchange transactions among customers, SAT-H is a charging and statistic facility for issuing bills for service and managing statistical information etc. in the electronic dealing system, NAM-ST is a general supervisory facility for centrally managing the state of operation of the equipment, and CTL is a subscriber control apparatus set at the subscriber's location for accommodating the lines with the host and controlling the dealing terminals.

The subscriber control apparatus CTL is provided with a management distribution server MDS for controlling the transmission and reception of data between a host and terminals and a video terminal controller VTC for supplying video signals to terminal screens and connecting with existing video terminals. The customer offices 23a and 23b are provided with Confirmation-sheet Automatic Transfer Terminal CAT-T's for storing and printing confirmation sheets (contracts) and a plurality of stand-alone type dealing terminals SAL. Here, the data is enciphered by the data encipher apparatuses 26 so as to maintain confidentiality. Further, the data is divided in time and multiplexed by the time division multiplexer units (TDM). The customer office 23a corresponds, for example, to the dealing room of a domestic bank directly connected to a main center 21, while the customer office 23b corresponds, for example, to the dealing room of a foreign bank connected to the main center 21 and a sub-center 22 provided overseas through an international communication line (satellite communication line, submarine communication cable, etc.)

Figure 4:
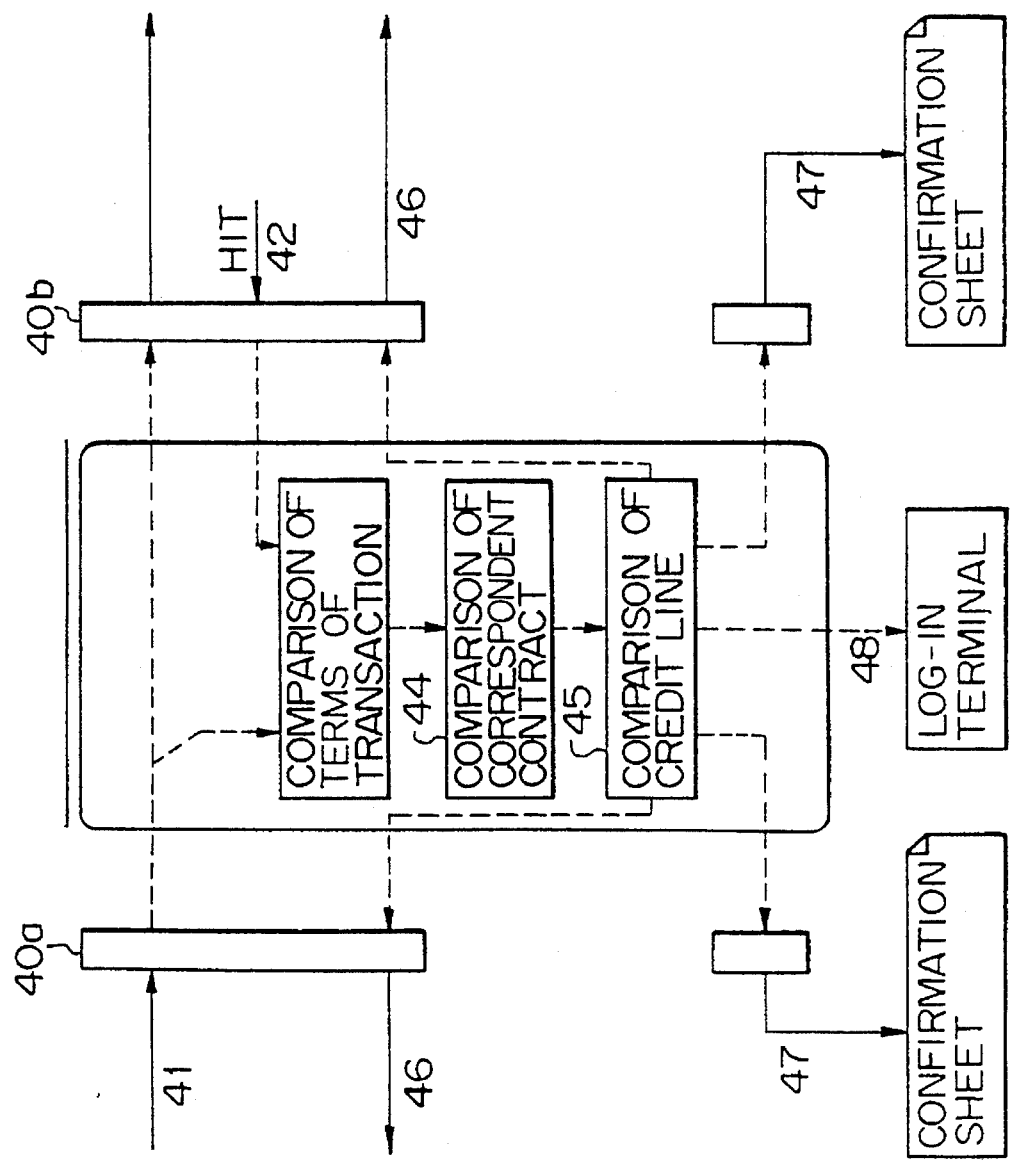
FIG. 4 is a view for explaining the processing in the market by the electronic dealing system to which the present invention is applied.

FIG. 4 is a view for explaining the processing in the market by the electronic dealing system to which the present invention is applied.

As shown in FIG. 4, first, when an operator places an order (41) through a dealing terminal 40a, that information becomes rate information. Then, for example, if there is a hit (42) from another dealing terminal 40b, the system compares the terms of the transaction (43), then compares the terms of the correspondent agreements (44), compares the credit lines (45), and outputs the results of the transaction (46) to the dealing terminals 40a and 40b. Here, for example, the operator can set the terms of the transaction when he places the order on the selling market. The operator determines the selling rate from the orders placed on the selling market. The system outputs changes to all terminals as the rate information (48). The system outputs confirmation sheets (47) through the CAT-T's provided at the customer offices (23a and 23b).

The above description gives a general outline of an electronic dealing system to which the present invention is applied. The features of the electronic dealing system of the present invention will be described in more detail below.

FIG. 5 is a view for explaining the state of the virtual terminal processes VTP's in an electronic dealing system based on the present invention. Here, the "leave order" characterizing the present invention means an order which a dealing terminal places on the market after the operator logs out.

In FIG. 5, first, in the usual pattern, when an operator starts log-in processing (501) and deal-in processing (502), he becomes able to deal in a predetermined market. This dealing is stopped when the operator starts deal-out processing (503). He then starts log-out processing (504) so as to end all operations. That is, in the usual pattern, dealing is possible from the deal-in processing (502) to the deal-out processing (503). Here, when the operator starts the deal-out processing, usually he starts the deal-out processing when there are no orders left. Conversely, in the leave-order pattern of the present invention, explained below, he starts the deal-out processing when there are still orders to be dealt in.

In the leave-order pattern, like with the above usual pattern, when an operator starts log-in processing (51) and deal-in processing (52), he becomes able to deal in a predetermined market. If the operator starts deal-out processing (53) and log-out processing (54) after having set the leave-order function when still able to deal in the market, the dealing terminal continues to place on the market any orders which still exist. Accordingly, when the operator logs out after having set the leave-order function (54), the system establishes transactions automatically for any orders placed on the market which meet the terms of transaction.

In this leave-order pattern, further, if the operator starts the log-in processing (55) from the logged out state with the leave-order function set, the system automatically executes deal-in processing (56) and displays the results of the transactions of the orders which had been placed as leave orders. Like with the usual pattern, further, if the operator starts the deal-out processing (57) without setting the leave-order function, the system stops the dealing and then the operator starts log-out processing (58) to end all operations. That is, in the leave-order pattern, dealing is possible from deal-in processing (52) to deal-out processing (57) when the leave-order function has not been set. When the leave-order function has been set, even deal-out processing (53) and log-out processing (54) are performed, dealing continues. To stop the dealing, the operator has to have started the deal-out processing (57) without having set the leave-order function.

In this way, according to the electronic dealing system of the present invention, the system can safely continue transactions even when the operator is no longer at the dealing terminal. Accordingly, even when the operator using a certain dealing terminal is not present, the operator can continue to have his orders placed on the market.

In the above description, when the operator starts deal-out processing after having set the leave-order function, the association between the dealing terminal and the subscriber control apparatus (specifically the management distributor server MDS in the subscriber control apparatus CTL) (set by logging in and cut by logging out) is cut, but the individual virtual terminal process VTP continues to be supplied with the dealing service without stopping. Note that the conditions for placement of leave orders may be set as follows: (1) the leave-order function may be set for dealing in a single market, (2) when the system receives a deal-out request with designation of the leave-order function in a state where there are no orders placed, it issues a deal-out response (NG: no orders placed) and awaits a normal deal-out request, and (3) the system has a compulsory virtual terminal process VTP reset function by which an operator can request the compulsory release of the virtual terminal process in the leave-order state, the management distribution server MDS cancels all leave orders of a user when receiving the request for compulsorily resetting the virtual terminal process VTP, and the system stores the content of the file holding the results of transactions in a spill-out message file as a spill-out message.

FIG. 6 and FIG. 7 are views of an example of a sequence in the case of a leave-order state in the electronic dealing system of the present invention.

First, as shown in FIG. 6, in the case where the operator has previously set the leave-order function, if there is then a log-in request (601) and deal-in request (603) from the dealing terminal SAL, the management distribution server MDS sends back a log-in acceptance (602) and deal-in response (604) to the dealing terminal to enable dealing. When the operator places an order (605, 613) from the dealing terminal, the system transfers the order through the management distribution server MDS to the matching host MAT, and the matching host MAT sends back a command receipt response (614 and 606) through the management distribution server MDS to the dealing terminal. Here, when the operator normally places an order on the market, the matching host MAT notifies the results of the transaction (placement of order 615, 607) through the management distribution server MDS to the dealing terminal, and the dealing terminal and the managment distribution server MDS send back command receipt responses (608, 616) to the management distribution server MDS and the matching host MAT, respectively.

Next, if there is a deal-out request (609) and log-out request (611) from the dealing terminal, the management distribution server MDS sends back a deal-out response (610) and log-out response (612) to the dealing terminal. Here, in the present invention, if there is a deal-out request (609) in the state where there are orders present, the system automatically sets the leave-order function (sets the leave-order function and then logs out the operator). Then, as explained referring to FIG. 5, since the leave-order function is set, the system automatically establishes transactions for orders placed on the market which match the terms of transaction.

Further, as shown in FIG. 7, if there are a log-in request (617) and deal-in request (619) from the dealing terminal, the management distribution server MDS sends back a log-in acceptance (618) and deal-in response (620) to the dealing terminal to enable dealing. At this time, the system automatically designates the market for which the leave-order function had been set by the deal-in request (619) (application ID for which leave-order function is set) and displays a screen corresponding to the screen just before that on the dealing terminal. At this time, the dealing terminal simultaneously displays the results of transactions made during the time the leave-order function was set. Note that the abovementioned application ID is the ID for designating one market from among the various markets.

Figure 8A:
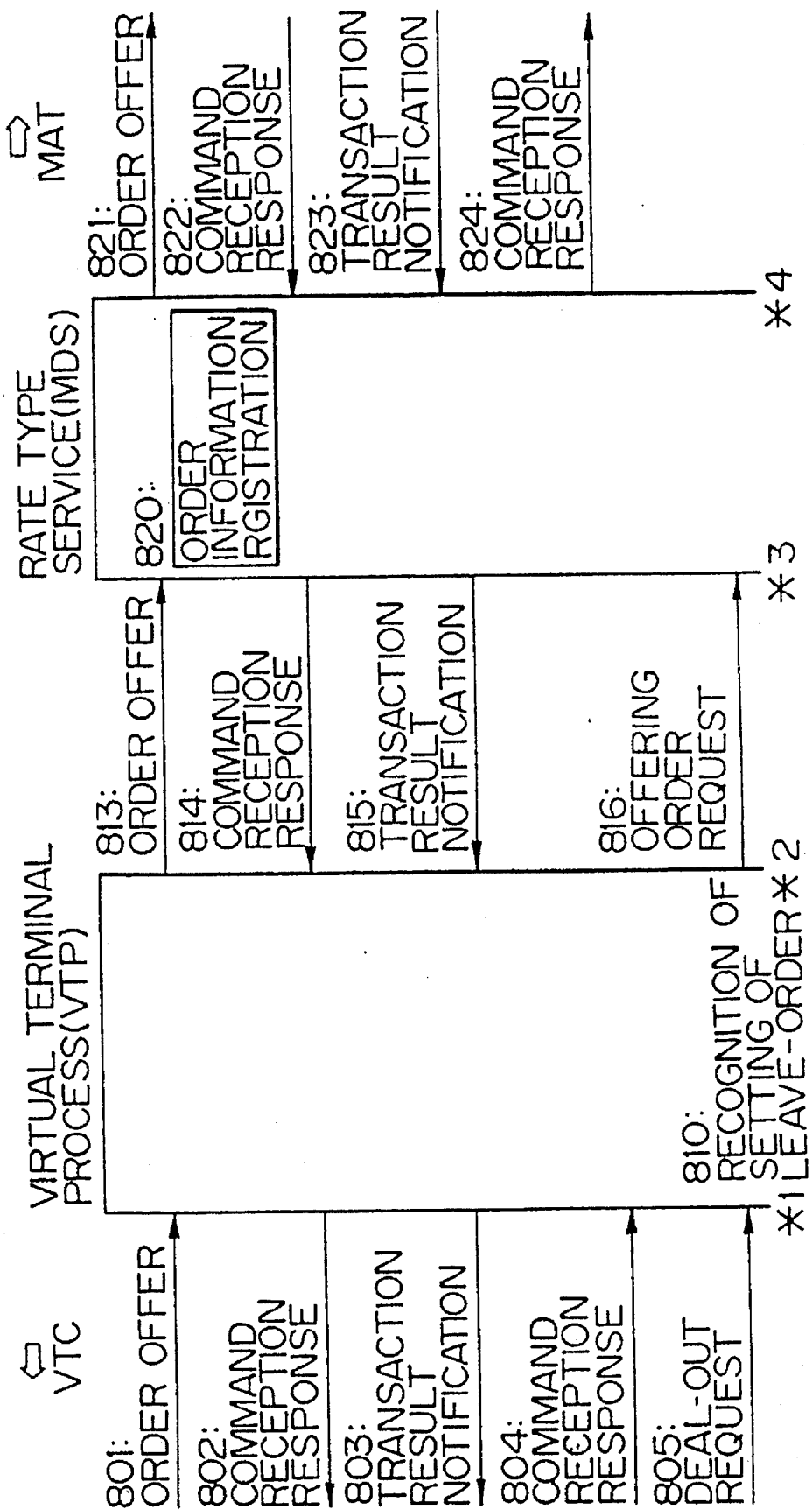

FIGS. 8A and 8B and FIG. 9 are views of an example of a control sequence in the case of establishment of a transaction in the leave-order state in the electronic dealing system of the present invention.

First, as shown in FIGS. 8A and 8B, if an operator places an order (801, 813, 821) from a dealing terminal VTC in the deal-in state, the system transfers the order through the virtual terminal process VTP and the rate type service (MDS) to the matching host MAT, which then sends back a command receipt response (822, 814, 802). The rate type service (MDS) records the order information (820). Further, when an operator places an order normally on the market, the matching host MAT notifies the results of the transaction (823, 815, 803) to the dealing terminal VTC and the dealing terminal VTC sends back a command receipt response (804,824) to the rate type service MDS. The rate type service MDS then sends back a command receipt response (824) to the matching host MAT. Here, the matching host MAT notifies the results of transactions for those orders which have been placed (823, 815, 803).

Next, when there is a deal-out request at a dealing terminal VTC (805), the system recognizes if the leave-order function has been set (810). That is, the virtual terminal process VTP requests if there are any pending orders (816) to the rate type service, which refers to the recorded order information (820) and responds if there are any pending orders (817). At this time, if there is one or more orders present, the system sets the leave-order function and sends back a deal-out response (806) to the dealing terminal VTC. If there is then a log-out request (807) from the dealing terminal VTC, if the virtual terminal process VTP is active (811), the virtual terminal process VTP sends back a log-out response (808) to the dealing terminal VTC which then manages and cuts the terminal connection (809). Here, the system holds the orders (812) placed after the leave-order function has been set in a file in the virtual terminal process VTP for later notification of the results of transactions (818) (sent to the dealing terminal for notification of the results of transactions after the operator has logged in once again). If a transaction is established while the leave-order function is set, that is, if an order placed on the market in the leave-order state meets the terms of transaction and a transaction is established, the matching host MAT notifies the results of the transactions (825, 819) to the virtual terminal process VTP where they are held in a file. Further, at this time, the virtual terminal process VTP sends back a command receipt response (826) through the rate type service to the matching host MAT. Further, the matching host MAT ahead of the rate type service performs processing during the leave-order state in the same way as the usual processing.

Further, as shown in FIG. 9, when there is a log-in request (827) from the dealing terminal VTC in the state with the leave-order function set, the virtual terminal process VTP sends back a log-in response (828). When there is then a deal-in request (829) from the dealing terminal VTC, the virtual terminal process VTP sends back a deal-in response (830). Further, the virtual terminal process VTP takes out results of transactions during the leave-order state (833) from its file holding the results of transactions and notifies them to the dealing terminal VTC (831). The virtual terminal process VTP receives a command receipt response (832) from the dealing terminal VTC, then recognizes the release of the leave-order function (834). The processing for notification of the results of transactions (831) and the command receipt response (832) is repeated until all the transactions established during the leave-order state finish being sent to the terminal.

As mentioned above, the system is set up so that when it receives a log-in request (827) from a dealing terminal VTC, it automatically displays a screen corresponding to the screen at the time the operator dealt out (805) just before along with the results of the transaction during the leave-order state. That is, in the leave-order state (time when the leave-order function is set), it is possible to display the results of established transactions, orders which have not been filled, and other various types of events.

Figure 10A:
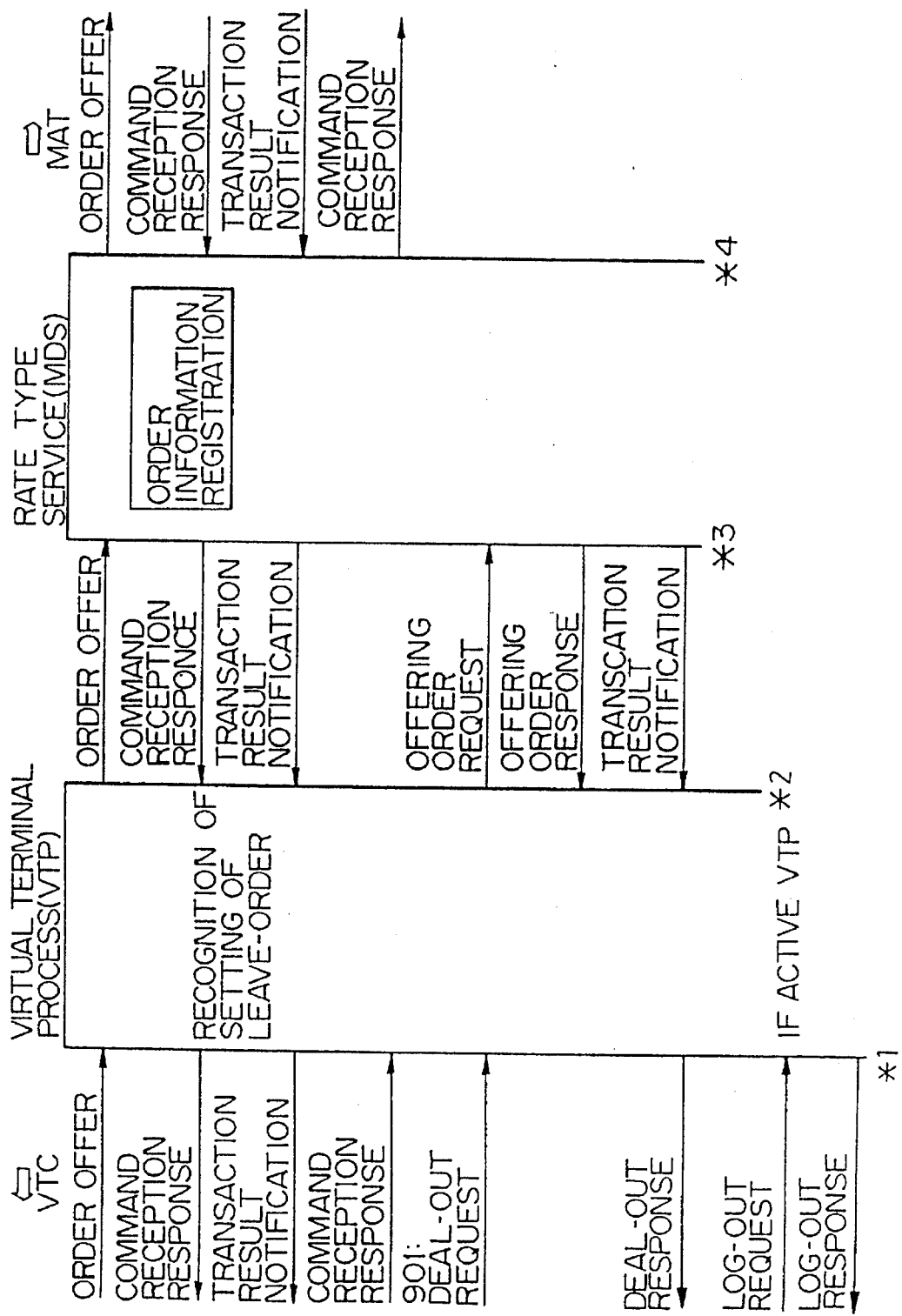
Figure 12A:
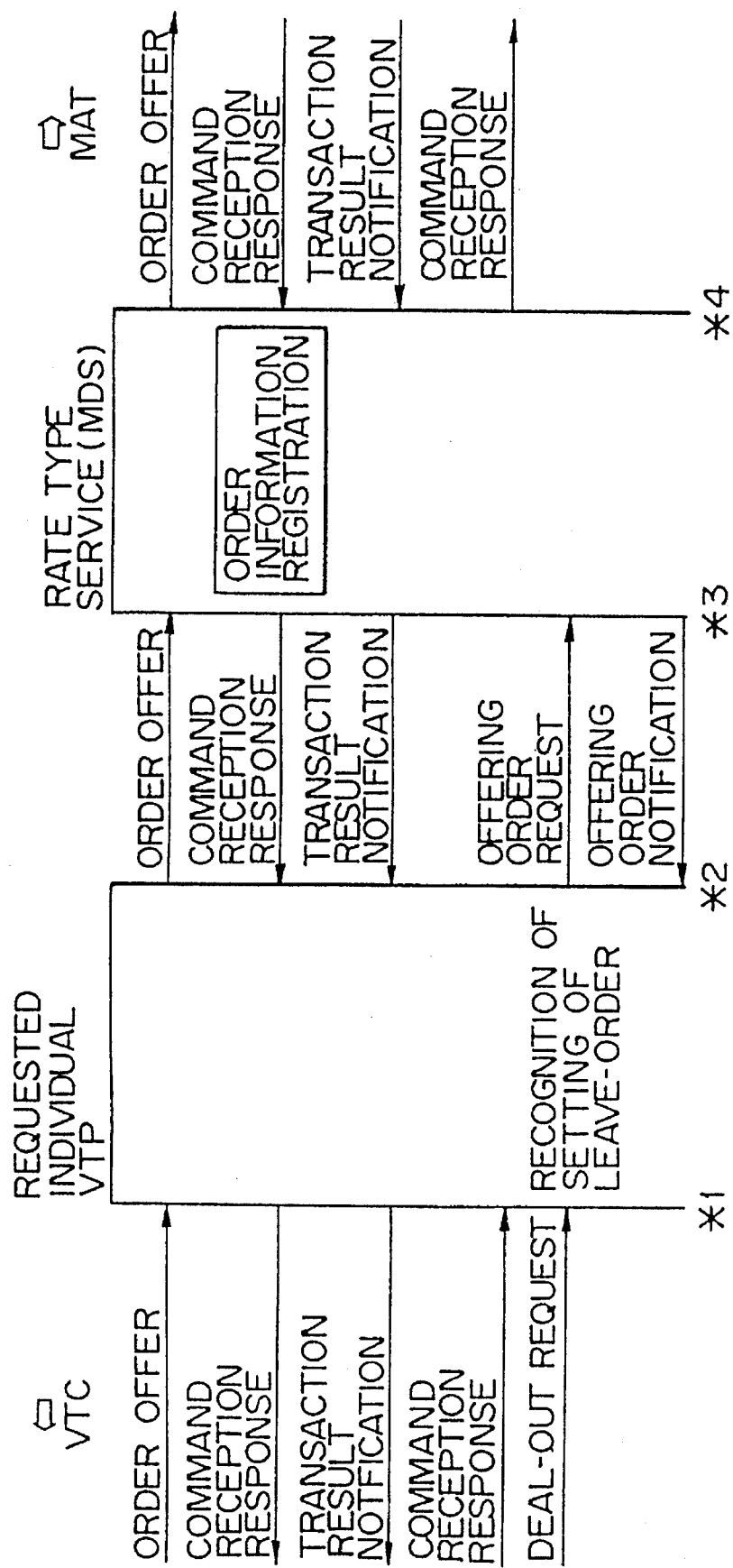

FIGS. 10A and 10B and FIG. 11 are views of an example of a control sequence in processing for canceling the leave-order state at a set time in the electronic dealing system of the present invention. The control sequence shown in FIGS. 10A and 10B and FIG. 11 basically is the same as that shown in FIGS. 8A and 8B and FIG. 9. An explanation will be made only of the portions relating to the processing for cancelation of the leave-order state at a set time.

As shown in FIGS. 10A and 10B, when there are one or more orders present in the deal-in state, if there is a deal-out request (901: corresponding to deal-out request (805) in FIG. 8A), the system sets the leave-order function. At this time, the operator inputs the time for cancelation of the leave-order state from the dealing terminal VTC to set this in the virtual terminal process VTP. When the virtual terminal process VTP recognizes that the cancelation time has arrived (902), it sends a request for cancelation of orders (904) to the rate type service and a request for cancelation of transactions (908) by all cancelation for user (906) to the matching host MAT. Further, the matching host MAT sends back the results of the cancelation of transactions (909) to the rate type service, which then deletes the order information (907) and notifies the virtual terminal process VTP of the cancelation of transactions (905). The virtual terminal process (VTP) stores in its file (903) for holding the results of transactions in the leave-order state and the processing for cancelation of the leave-order state due to the arrival of the cancelation time (notifies cancelation of transactions).

As shown in FIG. 11, if there is then a log-in request (910: corresponding to log-in request 827 in FIG. 9) from a dealing terminal VTC in the state where the leave-order function is set, the virtual terminal process VTP notifies the dealing terminal VTC of the results of the transactions (911) and of the cancelation of transactions (912) kept in its file for holding the results of transactions.

As mentioned above, the system may be constituted not only so that the leave-order function is maintained after being set until the next log-in processing, but also so that it is canceled and the orders placed on the market as leave orders are withdrawn when a preset time arrives.

FIGS. 12A and 12B, FIG. 13, and FIG. 14 are views of an example of a control sequence in processing for compulsorily resetting a virtual terminal process VTP in a leave-order state in the electronic dealing system of the present invention. They show the sequence by which another dealing terminal can cancel a leave-order function. The control sequence shown in FIGS. 12A and 12B to FIG. 14 basically is the same as that shown in FIGS. 8A and 8B and FIG. 9. In particular, FIGS. 12A and 12B correspond to FIGS. 8A and 8B. An explanation will be made only of the portions relating to the processing for compulsorily resetting the virtual terminal process VTP in the leave-order state.

First, the "processing for compulsorily resetting the virtual terminal process VTP" functions to compulsorily end the processing of the active virtual terminal process VTP of a management distribution server MDS with no Minex In-house Protocol (MIP) association with the terminal at the time when the leave-order function has been set. Further, as the Protocol Data Unit (PDU), use is made of a compulsory log-out request PDU. The difference between the function for compulsorily resetting the virtual terminal process VTP and a compulsory log-out is the state of whether the user (operator) is logging in or not and the difference in the method of notification of the cancelation of orders. Here, if an individual virtual terminal process VTP receives a request for resetting, as shown by reference numeral 139 (bottom left in FIG. 12B), it request cancelation of transactions (135) by ordering a log-out (133), notifies the virtual terminal process VTP of the results of cancelation of transactions (136), then copies the order information to the spill-out message bulletin board of the user.

As shown in FIG. 13, in the state where the leave-order function has been set by a certain dealing terminal VTC, for example, when a need arises for another dealing terminal VTC to compulsorily cancel (compulsorily reset the virtual terminal process VTP) the leave-order state of that dealing terminal VTC (whose operator is not present) due to a sudden change in the rate etc., the other dealing terminal requests compulsory log-out (131) to the requested individual virtual terminal process VTP and orders log-out (133) to that requested individual virtual terminal process VTP. Further, the requested individual virtual terminal process VTP requests cancelation of transactions (135) to the rate type service, which requests cancelation of transactions (137) to the matching host MAT. Further, the matching host MAT sends back the results of cancelation of transactions (138) to the rate type service, which then deletes the order information and notifies the virtual terminal process of the cancelation of transactions (136). The virtual terminal process (VTP) keeps the results of the transactions and the processing for another terminal to compulsorily cancel the leave-order state (notify cancelation of transactions) in its file for holding results of transactions during the leave-order state. Further, the virtual terminal process VTP copies the content of the file for holding the results of transactions on to the spill-out message bulletin board (139), then enters the initial state.

Further, as shown in FIG. 14, after the virtual terminal process VTP is compulsorily reset, if there is a log-in reuqest (141) and a deal-in request (143) from a dealing terminal VTC to the same individual virtual terminal process VTP, that virtual terminal process VTP sends back a log-in response (142) and deal-in response (144), but, at this time, it does not display the directly preceding dealing screen, but newly displays the same type of screen (i.e., FIG. 19A) as when the dealing service is started. Further, when there is a message retrieval request (145) from the dealing terminal VTC to the individual virtual terminal process VTP, the virtual terminal process VTP takes out the content copied on the spill-out message bulletin board by its compulsory resetting (such as the results of transactions established before the compulsory resetting) from the spill-out message bulletin board and sends back a message retrieval response (146). This enables the operator to check the results of the transactions.

In this way, when there is a sudden unforeseen change in the rate, even if the operator is not present at a certain dealing terminal, the operator of another dealing terminal (for example, an adjoining one) can compulsorily reset the virtual terminal process VTP so as to cancel the orders placed on the market by that certain terminal by the leave-order function. Further, it is possible to construct the system so that only a user with a higher ID (for example, an operator with a higher rank) can compulsorily reset the virtual terminal process VTP. In general, the order of rank, from the top down, is a manager, chief dealer, and then dealer.

Figure 15:
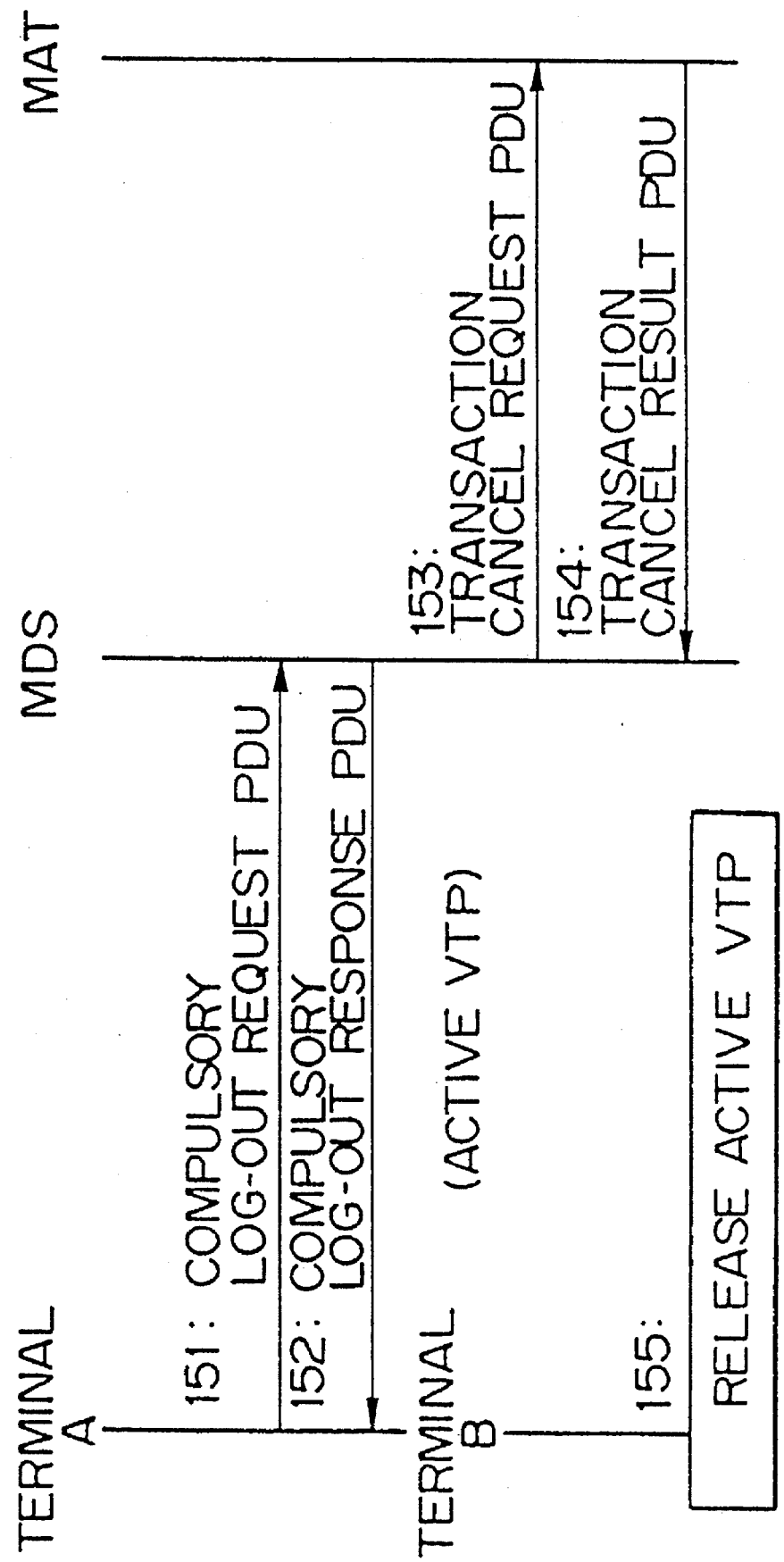
FIG. 15 is a schematic view of an example of a sequence in processing for compulsorily resetting a virtual terminal process VTP in the leave-order state in the electronic dealing system of the present invention.

FIG. 15 is a schematic view of an example of a sequence in processing for compulsorily resetting a virtual terminal process VTP in a leave-order state in the electronic dealing system of the present invention.

In the sequence of the PDU at the time of a compulsory reset, when a terminal A sends a compulsory log-out request (151) to the management distribution server MDS, the management distribution server MDS sends back a compulsory log-out response (152). Further, when the terminal B is an active virtual terminal process VTP, the management distribution server MDS requests cancelation of transactions (153) to the matching host MAT, which in turn notifies the management distribution server MDS of the results of cancelation of transactions (154) and releases the active virtual terminal process VTP (155).

Here, the conditions enabling compulsory resetting of a virtual terminal process VTP are (1) that a compulsory virtual terminal process VTP reset function be allowed for the user and (2) that the designated virtual terminal process be an active virtual terminal process VTP.

Figure 16:
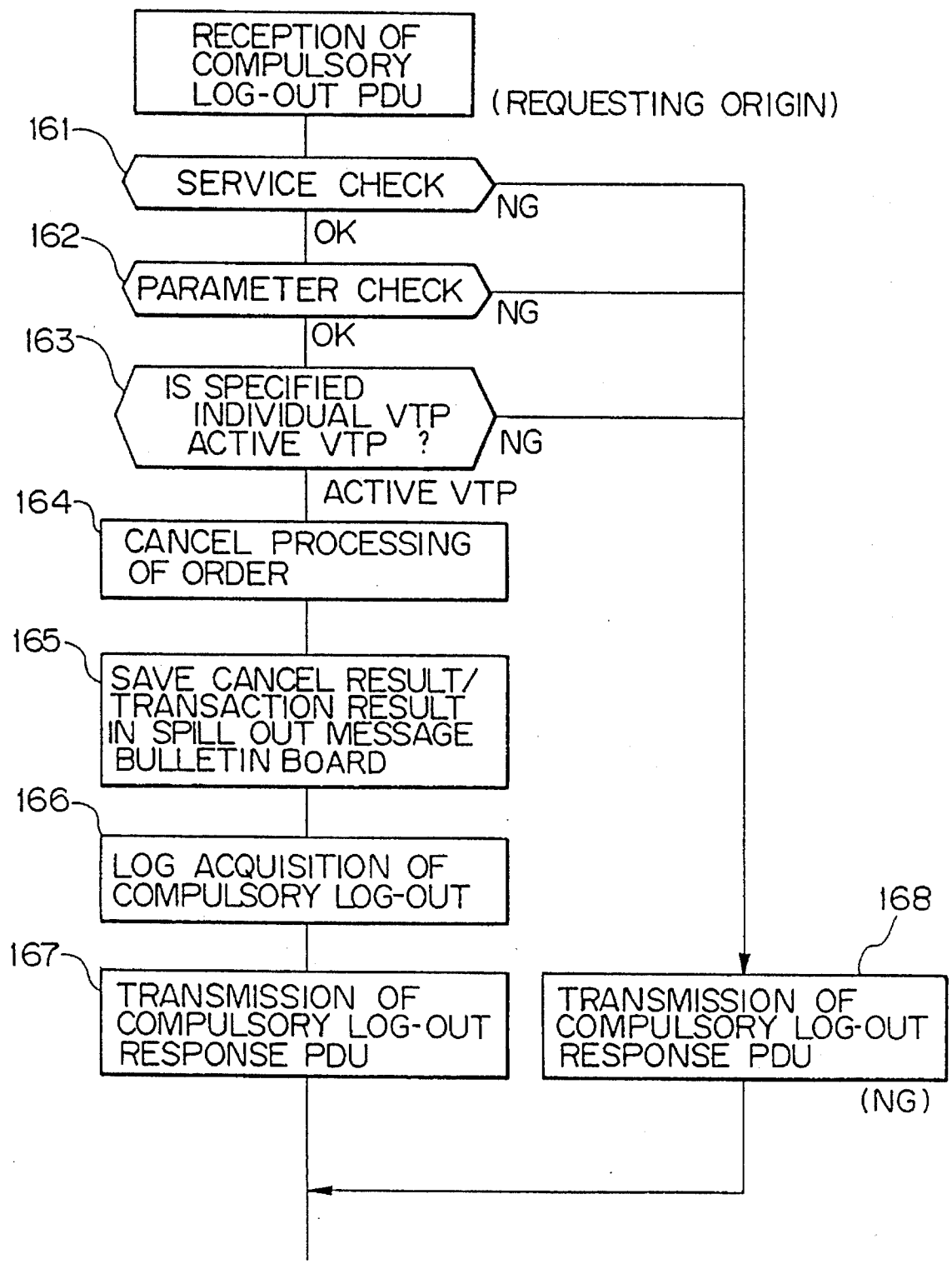
FIG. 16 is a flow chart of an example of processing for compulsorily resetting a virtual terminal process VTP in the leave-order state in the electronic dealing system of the present invention.

FIG. 16 is a flow chart of an example of processing for compulsorily resetting a virtual terminal process VTP in a leave-order state in the electronic dealing system of the present invention.

As shown in FIG. 16, first, at step 161, it is judged if the rank of the user of the requesting terminal allows compulsory log-out service (compulsory resetting of the virtual terminal process VTP) or not. If it allows it, then the routine proceeds to step 162. At step 162, it is judged if there is a user present. If present, the routine proceeds to step 163. At step 163, it is judged if the designated individual virtual terminal process VTP is an active virtual terminal process VTP. When the designated individual virtual terminal process VTP is an active virtual terminal process VTP, the routine proceeds to step 164, where processing is performed for canceling the orders (compulsory resetting of the virtual terminal process VTP) and the routine proceeds to step 165. Here, if the answer is negative (NG) at steps 161 to 163, the routine proceeds to step 168, where a compulsory log-out response (NG) is sent out.

At step 165, the results of the cancelation and the results of the transactions are saved on the spill-out message bulletin board, then the routine proceeds to step 166. Here, the information saved on the spill-out message bulletin board at step 165 (results of cancelation and results of transactions) can be read out at the request of the user (operator). At step 166, the log of the compulsory log-out is acquired and then the routine proceeds to step 167, where a compulsory log-out response (OK) is sent out.

Here, the information on the establishment of transactions and the information on cancelation of orders etc. at the active virtual terminal process VTP are kept (stored) in the file for holding the results of transactions, but the user (operator) can determine changes in the orders when logging out from the stored information sent out at the time of logging in. Further, the PDU stored in the file holding the results of transactions includes (1) notifications of the results of transactions, (2) notifications of cancelation of transactions, and (3) requests for status confirmation.

Figure 17:
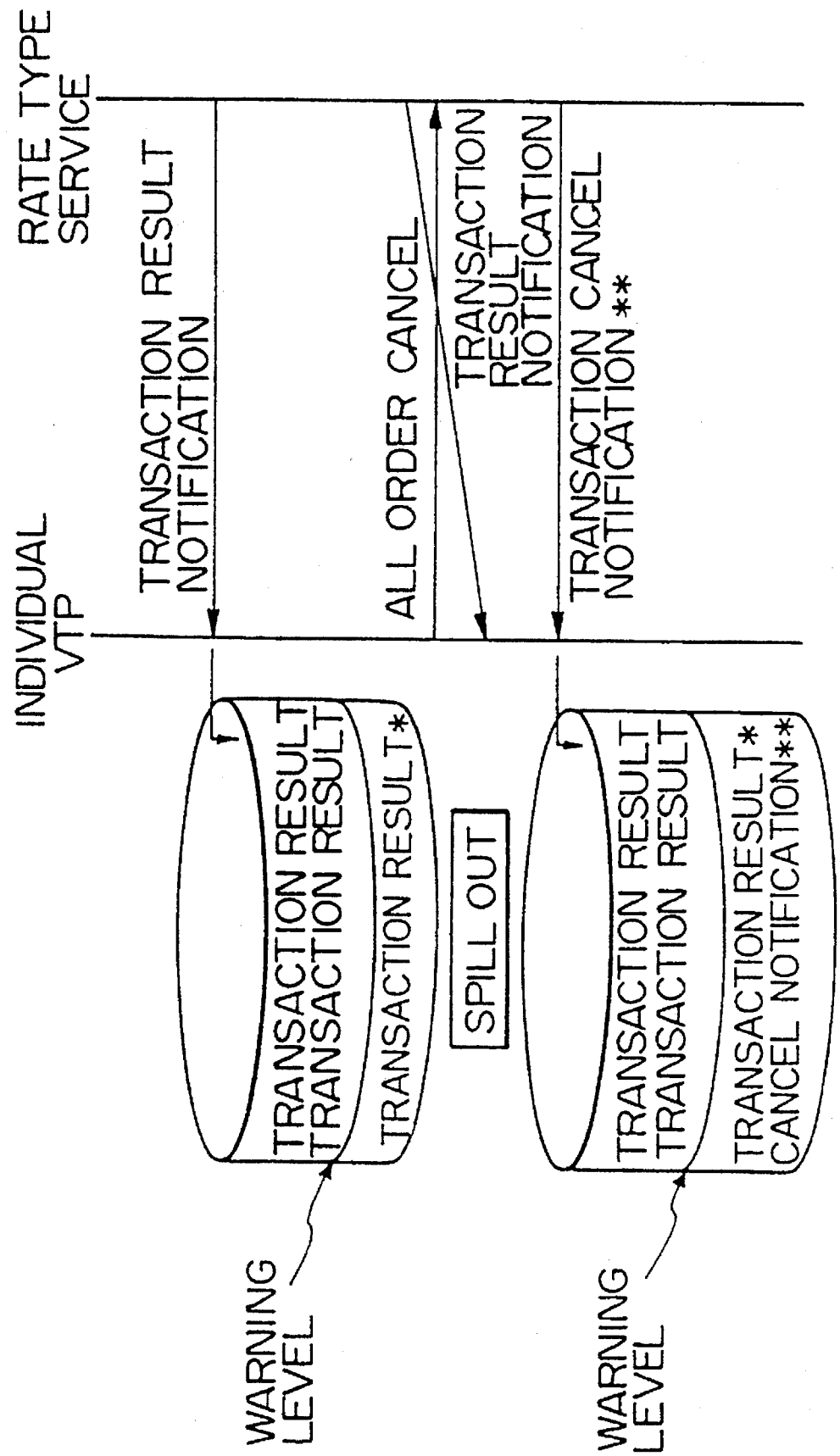
FIG. 17 is a view of an example of processing for dealing with congestion in a file holding the results of the transactions in the electronic dealing system of the present invention.

FIG. 17 is a view of an example of processing for dealing with congestion in a file for holding results of transactions in the electronic dealing system of the present invention.

As shown in FIG. 17, the file for holding the results of transactions stores messages until the resources of the system become congested (until the warning level is reached, for example, until 80 percent of capacity is reached). Here, when the system detects the congested state and the warning level is reached, the system cancels all orders and stores notifications of cancelation of transactions in the file for holding the results of transactions. Further, when a command to cancel all transactions and notifications of the results of transactions and notifications of cancelation of transactions or the like cross, the notifications of results of transactions and other messages are spilled out.

FIGS. 18A and 18B to FIG. 23 are views of examples of the display screens of a dealing terminal in the electronic dealing system of the present invention.

Figure 18A:
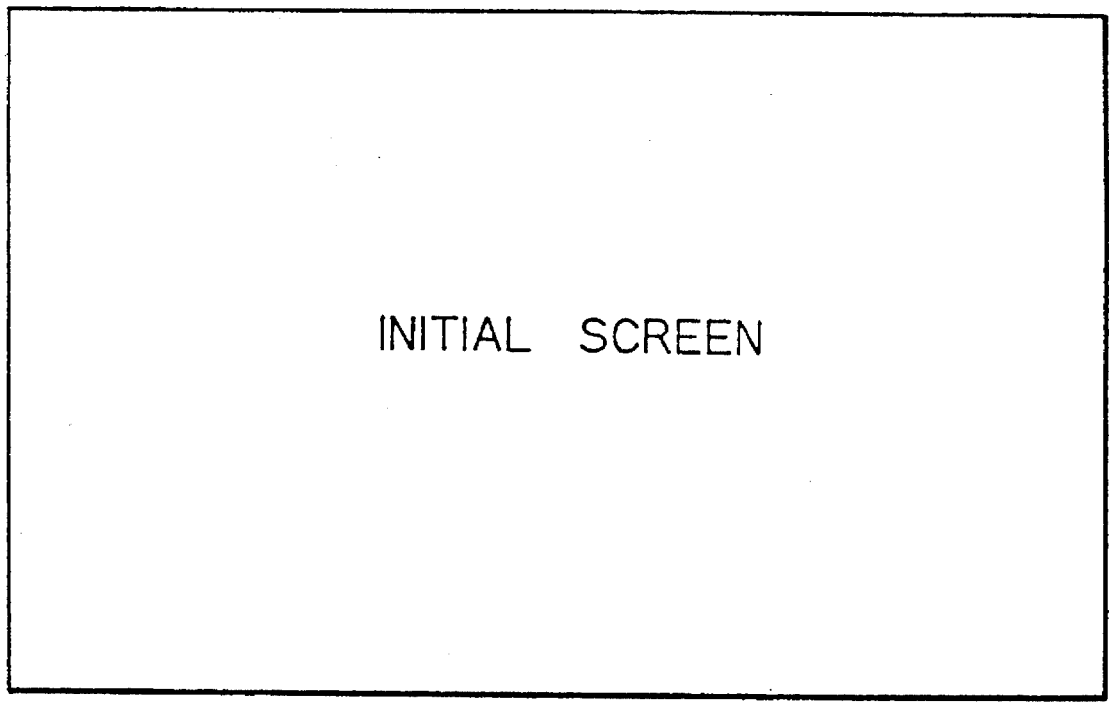
FIGS. 18A and 18B are views of examples of screens displayed on a terminal in the electronic dealing system of the present invention (part 1)
Figure 18B:
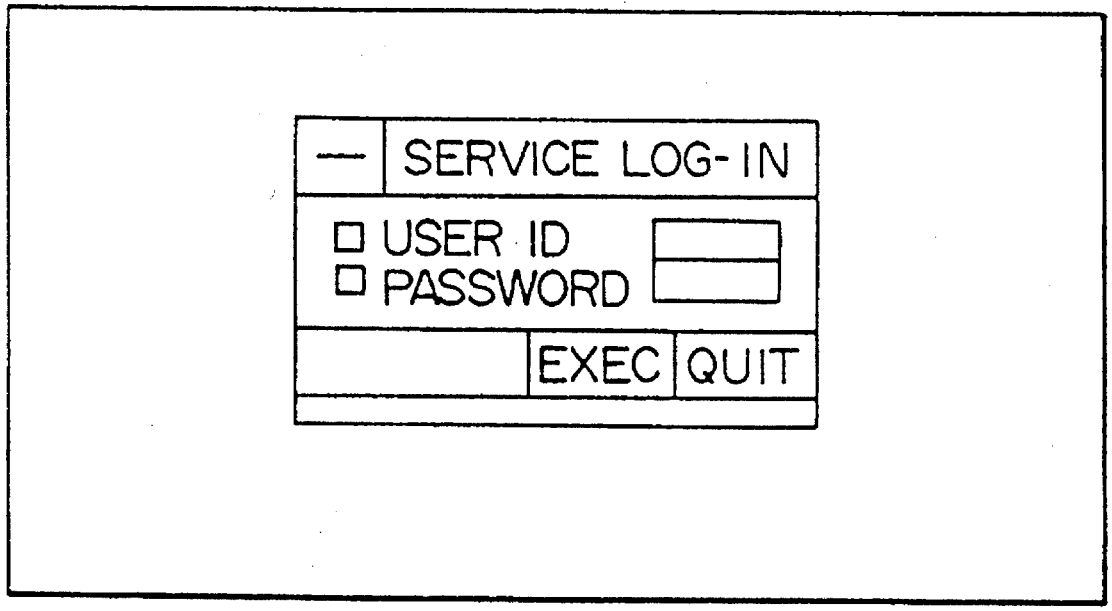

First, when the operator turns on the power of the dealing terminal, the terminal displays the initial screen shown in FIG. 18A. When he then depresses any key, the terminal displays the log-in screen shown in FIG. 18B (log-in window screen). When he inputs his user ID, password, etc. in the log-in window screen of FIG. 18B and logs in, that is, when the log-in is accepted, the screen becomes the management screen shown in FIG. 19A. Further, when he initiates log-in processing at the management screen of FIG. 19A, more particularly, when a deal-in response is received, the screen becomes the dealing service screen shown in FIG. 19B and dealing can be performed.

Next, as shown in FIG. 20, the operator places orders on the market, for example, places three offers (200), by an offer command (OFFER) on the dealing service screen of FIG. 19B. More specifically, in this illustration, the operator places the following orders on the market: (1) an offer (OFFER) order of a price of "123.45" and an amount of "10", (2) an offer order of a price of "233.50" and an amount of "10", and (3) an offer order of a price of "123.60" and an amount of "10". Reference numeral 201 shows information on orders placed on the market.

Further, as shown in FIG. 21, when the operator selects "leave out" (leave-order function) in the state where orders have been placed, the terminal displays the leave-out window screen. It becomes possible to set the terminal for cancelation of the leave-order state at a set time on the leave-out window (210) in FIG. 21. That is, if the operator sets the cancelation time in the leave-out window (210) in the leave-out window screen shown in FIG. 21, then processing for canceling the leave-order state at a set time as explained with reference to FIGS. 10A and 10B and FIG. 11 becomes possible. More specifically, FIG. 21 shows the case of cancelation of the leave-order state after 10 hours. Further, if the operator depresses "EXEC" (execution) for example in the leave-out window screen of FIG. 21, the terminal displays the initial screen shown in FIG. 22A and the operator is logged out. Here, if the operator initiates deal-out processing and log-out processing in a state where all orders have been deleted, the usual pattern of the top portion of FIG. 5 is followed.

Here, an explanation will be made of the screen transition assuming that the following orders are hit (transactions are established) during the leave-order state. That is, the offer order of a price of "123.45" and an amount of "10" and an offer order of a price of "123.50" and an amount of "10" are hit and consequently just the offer order of a price of "123.60" and an amount of "10" remains.

Figure 22A:
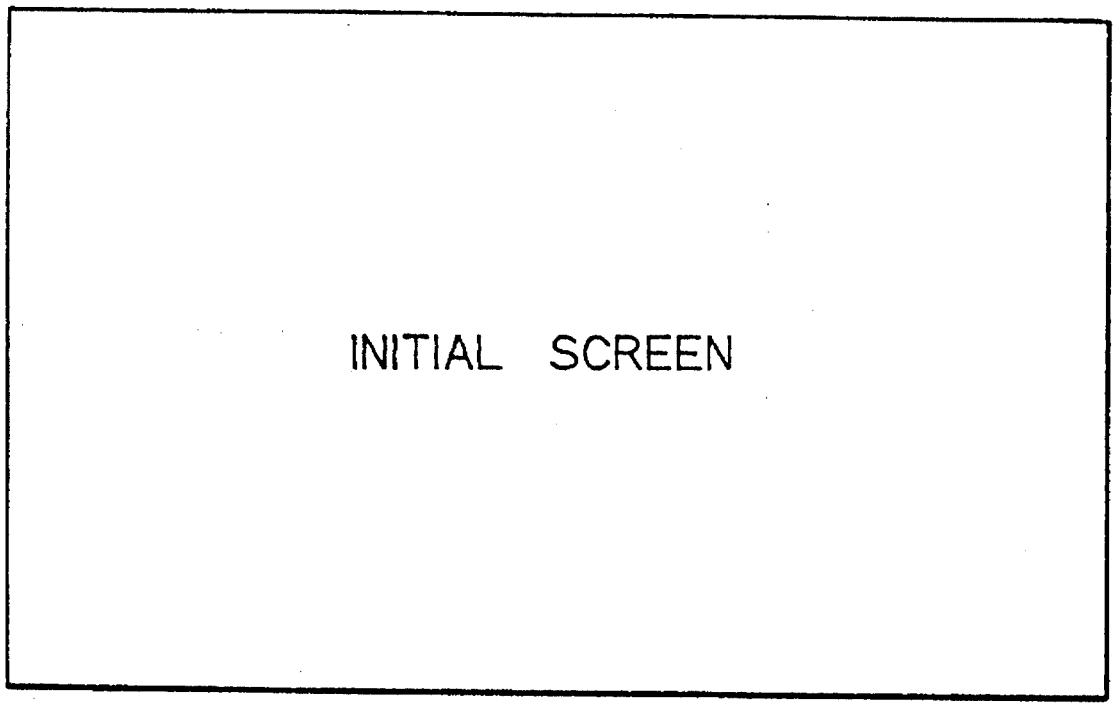
FIGS. 22A and 22B are views of examples of screens displayed on a terminal in the electronic dealing system of the present invention (part 5)
Figure 22B:
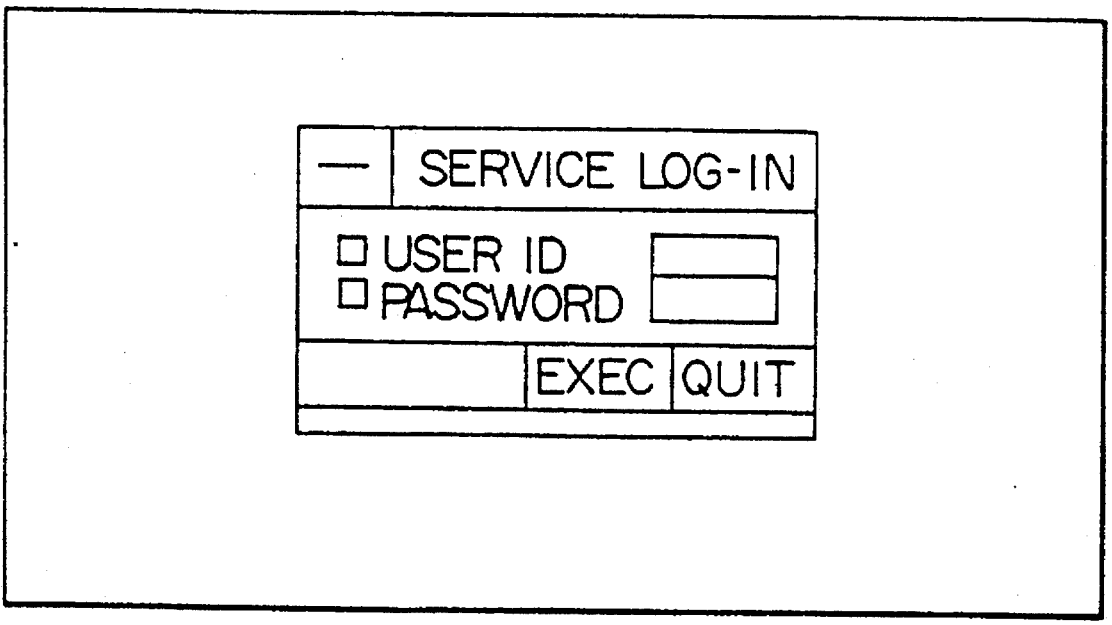

If the operator initiates log-in processing (logs in again) from the logged-out state where the leave-order function had been set, the terminal changes from the screen of FIG. 22A to the log-in window screen of FIG. 22B. When the operator then inputs his user ID and password etc. so as to log in, the terminal does not display the management screen corresponding to FIG. 19A, but automatically performs deal-in processing and displays the dealing service screen shown in FIG. 23. The screen shown in FIG. 23 corresponds to the screen shown in FIG. 20 at the time of the deal-out processing just before. In FIG. 23, however, the results of the transactions established during the leave-order state are displayed. That is, the screen displays the results of transactions (230) established during the leave-order state (time during which the leave-order function is set), more specifically, the information (230) showing that the offer order of the price of "123.45" and the amount of "10" and the offer order of the price of "123.50" and the amount of "10" have been hit and the orders (231) remaining without establishment of transactions, more specifically, the information (231) showing that the offer order of the price of "123.60" and the amount of "10" remains.

In the above explanation, the electronic dealing system of the present invention was explained with reference to foreign exchange transactions, but the invention can be applied to various other types of transactions as well. Further, the display screens are not limited to those shown in FIGS. 18A and 18B to FIG. 23 and can be modified in various ways.

As explained in detail above, according to the electronic dealing system of the present invention, since the electronic dealing system is given a "leave-order" function by which a dealing terminal can continue to place orders on the market and automatically perform transactions even after the operator has logged out, transactions can be continued safely even when the operator is not present.

We claim:

1. An electronic transaction system for performing transactions by matching terms of sale and terms of purchase, said electronic transaction system including a leave-order function so that a dealing terminal continues to place orders in a market conditional on the matching of terms of transaction and automatically performs transactions even after an operator has logged out, wherein said leave-order function is set by deal-out processing where at least one order is requested by the dealing terminal.

2. An electronic transaction system as set forth in claim 1, wherein when log-in processing is executed after deal-out processing is executed with the leave-order function set, the system automatically executes deal-in processing which has been and displays a screen corresponding to the screen at the time of the deal-out processing together with the results of transactions in the time when the leave-order function had been set.

3. An electronic transaction system as set forth in claim 1, further comprising a facility for cancellation of the leave-order function.

4. An electronic transaction system as set forth in claim 1, wherein further comprising a facility for cancellation of the leave-order function by another dealing terminal.

5. An electronic transaction system as set forth in claim 1, wherein the leave-order function is entered by the execution of deal-out processing with orders remaining in the dealing service.

6. An electronic transactions system as set forth in claim 1, which performs log-in processing and deal-in processing to transact in a predetermined market, sets the leave-order function and performs deal-out processing and log-out processing where this transacting can be executed and continues to place any orders which still exist on the market.

7. An electronic transaction system as set forth in claim 6, which executes log-in processing from the log-out state with the leave-order function set so as to automatically perform deal-in processing, and which displays results of the transactions of the orders which had been placed as leave orders.

8. An electronic transaction system as set forth in claim 5, which continues the dealing even if the deal-out processing and log-out processing are performed until the deal-out processing is performed without the leave-order function being set.

9. An electronic transaction system as set forth in claim 5, wherein when executing deal-out processing while setting a leave-order function, the association between the dealing terminal and a subscriber control apparatus, which is set by logging in and cut by logging out, is cut, but the individual virtual terminal process continues to supply the dealing service without stopping.

10. An electronic transaction system as set forth in claim 9, which makes a deal-out request and a log-out request from the dealing terminal, returns a deal-out response and a log-out response from said subscriber control apparatus to the dealing terminal and, at that time, makes the deal-out request in the state where there are orders present so as to automatically set the leave-order function, whereby if the leave-order function is set, transactions are automatically established for orders placed on the market which match the terms of transaction.

* * * * *

UNITED STATES PATENT AND TRADEMARK OFFICE
CERTIFICATE OF CORRECTION

PATENT NO. : 5,508,913
DATED : April 16, 1996
INVENTOR(S) : Kenichi YAMAMOTO, et al.

It is certified that error appears in the above-indentified patent and that said Letters Patent is hereby corrected as shown below:

On the title page: Item [54] and Column 1, line 2, change "FREEZER" to --FOREIGN--.

Col. 1, line 2, change "FREEZER" TO --FOREIGN--.

Signed and Sealed this

Ninth Day of July, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,508,913
DATED : April 16, 1996
INVENTOR(S) : Kenichi YAMAMOTO, et al.

It is certified that error appears in the above-indentified patent and that said Letters Patent is hereby corrected as shown below:

On the title page: ITEM

[73] Assignee:
Insert the following two Assignees which were omitted from the Patent:

--Kokusai Denshin Denwa Co., Ltd., Tokyo, Japan and MINEX Corporation, Tokyo, Japan.--

Signed and Sealed this

Fourth Day of March, 1997

*Attest:*

BRUCE LEHMAN

*Attesting Officer*   Commissioner of Patents and Trademarks